(12) United States Patent
Ryan et al.

(10) Patent No.: US 11,008,102 B2
(45) Date of Patent: *May 18, 2021

(54) MANEUVERABLE CAPTURE APPARATUS FOR AIRBORNE DEPLOYMENT AND RETRIEVAL OF PARASITE AIRCRAFT

(71) Applicant: Bell Textron Inc., Fort Worth, TX (US)

(72) Inventors: Michael John Ryan, Colleyville, TX (US); Carlos Alexander Fenny, Fort Worth, TX (US); Joseph Scott Drennan, Dallas, TX (US); John Richard McCullough, Weatherford, TX (US); Brett Rodney Zimmerman, Hurst, TX (US)

(73) Assignee: Bell Textron Inc., Fort Worth, TX (US)

( * ) Notice: Subject to any disclaimer, the term of this patent is extended or adjusted under 35 U.S.C. 154(b) by 381 days.

This patent is subject to a terminal disclaimer.

(21) Appl. No.: 16/161,455

(22) Filed: Oct. 16, 2018

(65) Prior Publication Data

US 2020/0115054 A1    Apr. 16, 2020

(51) Int. Cl.
*B64D 5/00* (2006.01)
*B64C 39/02* (2006.01)
*B64C 3/56* (2006.01)

(52) U.S. Cl.
CPC ............ *B64D 5/00* (2013.01); *B64C 3/56* (2013.01); *B64C 39/024* (2013.01);
(Continued)

(58) Field of Classification Search
CPC ............ B64D 5/00; B64C 2201/082; B64C 2201/182; B64C 2201/206
See application file for complete search history.

(56) References Cited

U.S. PATENT DOCUMENTS 1,958,486 A    5/1934  Medvedeff
2,479,655 A *  8/1949  Weisz .................. B64D 5/00
                                                        244/2
(Continued)

FOREIGN PATENT DOCUMENTS

GB         2577335 A  *  3/2020  ............... B64D 5/00
WO    WO-2014080386 A2 * 5/2014  ............... B64D 5/00
(Continued)

OTHER PUBLICATIONS

Fenny, Carlos Alexander, et al., "U.S. Appl. No. 16/161,279," filed Oct. 16, 2018.
(Continued)

*Primary Examiner* — Joseph W Sanderson
(74) *Attorney, Agent, or Firm* — Shackelford, Bowen, McKinley & Norton, LLP

(57) ABSTRACT

In an embodiment, a maneuverable capture device includes a frame, a plurality of rotors secured to the frame, an attachment point disposed on the frame for securing a cable of a carrier aircraft to the frame, and an attachment feature configured to secure maneuverable capture device to a dock of a parasite aircraft. In an embodiment, a method of docking a maneuverable capture device with a parasite aircraft includes positioning a carrier aircraft above a parasite aircraft, releasing the maneuverable capture device attached to the carrier aircraft by a cable from the carrier aircraft, flying the maneuverable capture device to a dock of the parasite aircraft, and securing the maneuverable capture device to the dock of the parasite aircraft.

20 Claims, 22 Drawing Sheets

(52) U.S. Cl.
CPC .. *B64C 2201/027* (2013.01); *B64C 2201/082* (2013.01); *B64C 2201/206* (2013.01)

(56) References Cited

U.S. PATENT DOCUMENTS

| | | | |
|---|---|---|---|
| 2,653,777 A | 9/1953 | Barkey | |
| 2,778,611 A | 1/1957 | Cotton | |
| 2,967,684 A * | 1/1961 | Knecht | B64D 39/04 244/136 |
| 3,421,717 A * | 1/1969 | Di Piro | B64D 39/04 244/17.11 |
| 3,520,502 A | 7/1970 | Smethers, Jr. | |
| 4,267,987 A | 5/1981 | McDonnell | |
| 4,691,878 A | 9/1987 | Vaughan et al. | |
| 5,188,313 A * | 2/1993 | Piasecki | B64C 37/02 114/246 |
| 6,641,082 B2 * | 11/2003 | Bevilaqua | B64D 5/00 244/189 |
| 8,820,681 B2 * | 9/2014 | Brutoco | B64F 1/02 244/115 |
| 8,857,754 B2 * | 10/2014 | Ferrari | B64F 1/02 244/2 |
| 9,340,299 B2 * | 5/2016 | Yates | B64D 27/24 |
| 9,469,410 B2 * | 10/2016 | Peake | B64D 45/00 |
| 9,630,712 B1 * | 4/2017 | Carmack | B64D 5/00 |
| 10,569,868 B2 * | 2/2020 | von Flotow | B64C 27/32 |
| 10,654,584 B2 * | 5/2020 | Bosma | B64D 39/04 |
| 10,689,109 B2 * | 6/2020 | Wypyszynski | F41H 11/04 |
| 10,723,456 B2 * | 7/2020 | Lee | B64D 5/00 |
| 10,752,357 B2 * | 8/2020 | von Flotow | B64C 39/024 |
| 2009/0224098 A1 | 9/2009 | Karem | |
| 2013/0168497 A1 | 7/2013 | Rix | |
| 2013/0299634 A1 * | 11/2013 | Haggard | B64D 3/02 244/110 F |
| 2014/0339371 A1 * | 11/2014 | Yates | B64D 27/24 244/53 R |
| 2016/0075441 A1 * | 3/2016 | Elsawah | B64D 39/06 244/135 A |
| 2016/0355258 A1 * | 12/2016 | Williams | B05B 13/005 |
| 2017/0036762 A1 * | 2/2017 | Gamble | B64C 27/08 |
| 2017/0274997 A1 * | 9/2017 | von Flotow | B64C 39/024 |
| 2017/0297445 A1 * | 10/2017 | Zheng | B60L 53/14 |
| 2017/0297738 A1 * | 10/2017 | von Flotow | B64D 3/00 |
| 2017/0369169 A1 * | 12/2017 | Lee | B64D 5/00 |
| 2018/0105271 A1 * | 4/2018 | Wypyszynski | B64C 39/024 |
| 2018/0162545 A1 * | 6/2018 | Bosma | B64D 39/04 |
| 2019/0329886 A1 * | 10/2019 | Pinto | B64D 9/00 |
| 2020/0115052 A1 * | 4/2020 | Fenny | B64D 1/22 |
| 2020/0115053 A1 * | 4/2020 | Drennan | B64C 3/56 |
| 2020/0115054 A1 | 4/2020 | Ryan et al. | |

FOREIGN PATENT DOCUMENTS

| | | | | |
|---|---|---|---|---|
| WO | WO-2014080387 A2 * | 5/2014 | | B64C 39/024 |
| WO | WO-2019199202 A1 * | 10/2019 | | B64C 39/024 |

OTHER PUBLICATIONS

Drennan, Joseph Scott, et al., "U.S. Appl. No. 16/161,415," filed Oct. 16, 2018.
Wikipedia, "Parasite Aircraft," URL: <https://en.wikipedia.org/wiki/Parasite_aircraft>, Retrieved: Oct. 15, 2018.

* cited by examiner

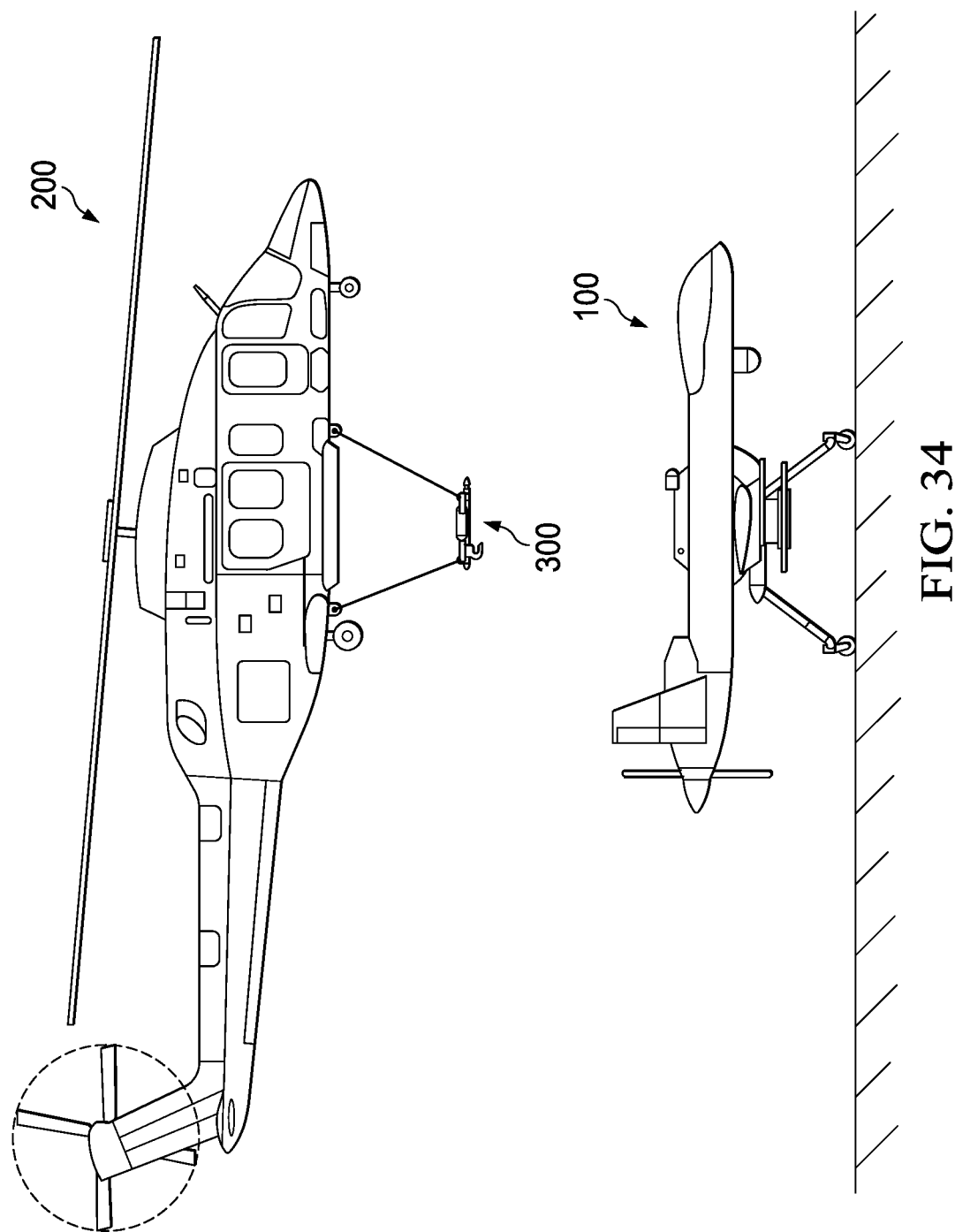

MANEUVERABLE CAPTURE APPARATUS FOR AIRBORNE DEPLOYMENT AND RETRIEVAL OF PARASITE AIRCRAFT

BACKGROUND

This section provides background information to facilitate a better understanding of the various aspects of the disclosure. It should be understood that the statements in this section of this document are to be read in this light, and not as admissions of prior art.

Using a host or carrier aircraft to launch a parasite aircraft in flight has been used in the past. Historically, the power requirements need to launch a parasite aircraft have required the carrier aircraft to be much larger than the parasite aircraft. Different methods and systems have been used to secure the parasite aircraft to the carrier aircraft. For example, parasite aircraft have been attached via latches, scaffoldings, arms, and combinations thereof. In practice, these methods of attachment are bulky and lack the ability to precisely retrieve the parasite aircraft during flight.

SUMMARY

An example of a maneuverable capture device includes a frame, a plurality of rotors secured to the frame, an attachment point disposed on the frame for securing a cable of a carrier aircraft to the frame, and an attachment feature configured to secure maneuverable capture device to a dock of a parasite aircraft.

An example of a method of docking a maneuverable capture device with a parasite aircraft includes positioning a carrier aircraft above a parasite aircraft, releasing the maneuverable capture device attached to the carrier aircraft by a cable from the carrier aircraft, flying the maneuverable capture device to a dock of the parasite aircraft, and securing the maneuverable capture device to the dock of the parasite aircraft.

An example of a method of undocking a maneuverable capture device from a parasite aircraft includes releasing the maneuverable capture device from a dock of the parasite aircraft, flying the maneuverable capture device away from the parasite aircraft, and reeling in a cable secured between the maneuverable capture device and a carrier aircraft.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIGS. 23-34 illustrate a method of deploying and retrieving a parasite aircraft according to aspects of the disclosure.

DETAILED DESCRIPTION

Figure 1:
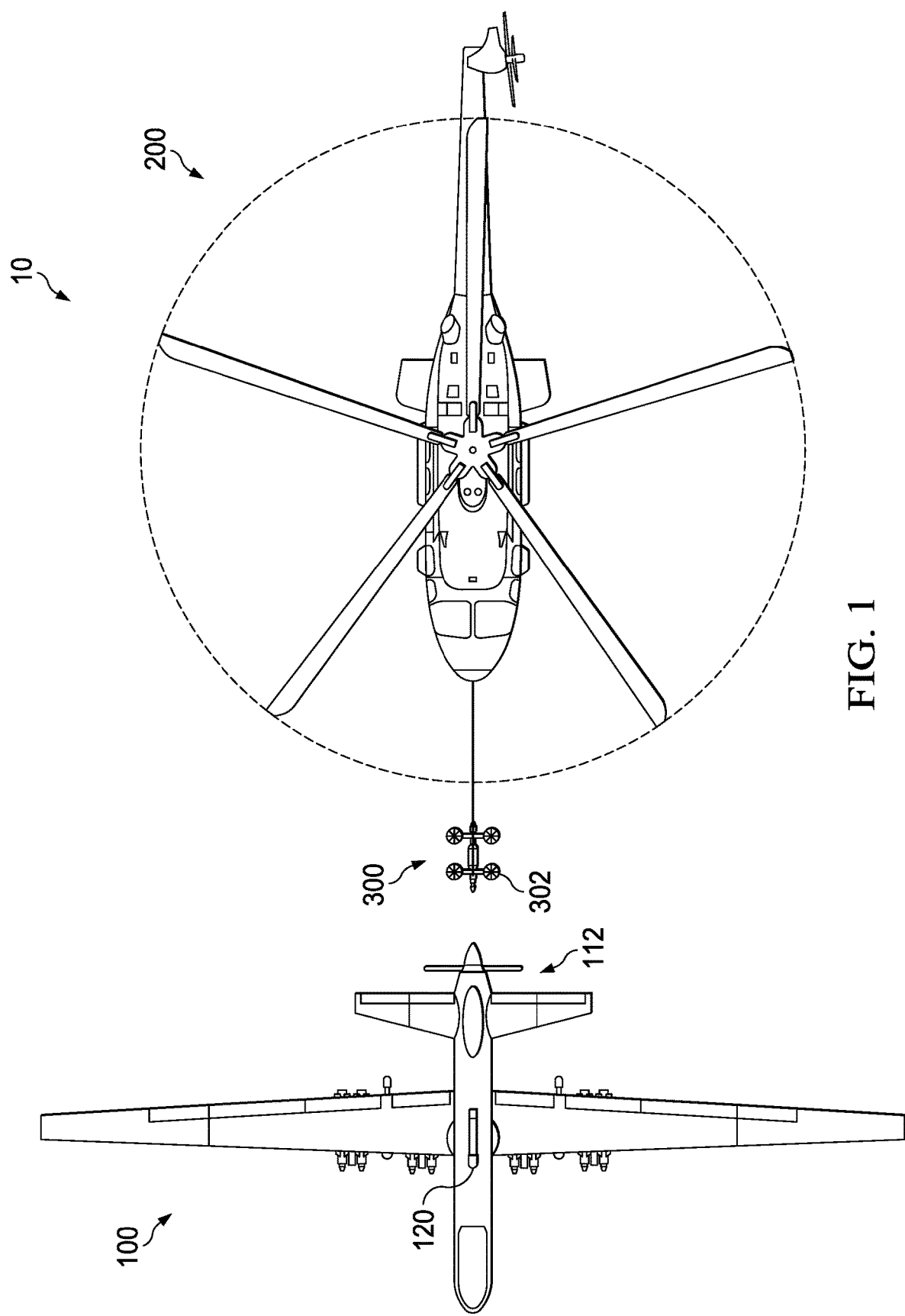
FIG. 1 illustrates a system for deployment and retrieval of a parasite aircraft according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1 illustrates a system 10 for deployment and retrieval of a parasite aircraft 100 according to aspects of the disclosure. System 10 includes parasite aircraft 100, a carrier aircraft 200, and a maneuverable capture device 300. As illustrated in FIG. 1, parasite aircraft 100 is a drone aircraft capable of autonomous flight. In some aspects, parasite aircraft 100 is a high-performance aircraft capable of very long duration flight (e.g., around twenty-four hours). In other aspects, parasite aircraft 100 could be a manned aircraft. Carrier aircraft 200 is illustrated as a helicopter (e.g., a Bell Helicopter 525). In other aspects, other helicopters or tiltrotor aircraft could be implemented. Maneuverable capture device 300 is a maneuverable aircraft that is tethered to carrier aircraft 200 via cables 202. Cables 202 are secured at a first end to carrier aircraft 200 and at a second end to maneuverable capture device 300. Cables 202 are strong enough to support the entire weight of parasite aircraft 100. Cables 202 can also be configured to provide electrical power to maneuverable capture device 300 to power a plurality of rotors 302. As illustrated in FIG. 1, maneuverable capture device 300 includes four rotors 302. Each rotor 302 can pivot to allow thrust vectoring to precisely control maneuverable capture device 300 to and from parasite aircraft 100.

To deploy parasite aircraft 100 into flight, parasite aircraft 100 is placed on a loading surface, such as the ground or a platform of a ship. Carrier aircraft 200 then hovers above parasite aircraft 100. Maneuverable capture device 300 is then launched from carrier aircraft 200 to guide cables 202 to parasite aircraft 100. Cables 202, which may be secured to carrier aircraft 200 by a winch or other device that allows a length of cables 202 to be controlled, are let out and the plurality of rotors 302 are used to guide maneuverable capture device 300 and cables 202 down to a dock 120 of parasite aircraft 100. Dock 120 is configured to receive and lock onto maneuverable capture device 300.

In some aspects, maneuverable capture device 300 guides itself to parasite aircraft 100. For example, parasite aircraft 100, carrier aircraft 200, and/or maneuverable capture device 300 can include avionics, sensors, radar, light detection and ranging (LIDAR), global position system sensors and equipment (GPS), cameras, and the like that can be used to automate guidance of maneuverable capture device 300 to dock 120. In some aspects, maneuverable capture device 300 is piloted remotely to parasite aircraft 100. For example, a person aboard carrier aircraft 200 can remotely pilot maneuverable capture device 300 to dock 120. In some aspects, cameras may be positioned on parasite aircraft 100, carrier aircraft 200, and/or maneuverable capture device 300 to assist the person piloting maneuverable capture device 300.

With maneuverable capture device 300 secured to parasite aircraft 100, carrier aircraft 200 gains altitude to lift parasite aircraft 100 from the ground or platform. Next, carrier aircraft 200 gains speed and a propulsion system 112 of parasite aircraft 100 is powered on to provide thrust for parasite aircraft 100. Once carrier aircraft 200 has gained enough speed, maneuverable capture device 300 disengages from dock 120 and guides itself clear of parasite aircraft 100 and back to carrier aircraft 200 using the plurality of rotors 302. Parasite aircraft 100 is now free to fly and carry on its own mission.

To retrieve parasite aircraft 100, the procedure described above is reversed. Parasite aircraft 100 slows its speed such that carrier aircraft 200 can maintain a similar airspeed. Once carrier aircraft is in position above parasite aircraft 100, maneuverable capture device 300 is deployed and guided by the plurality of rotors 302 to dock 120 of parasite aircraft 100. After maneuverable capture device 300 is secured in dock 120, propulsion system 112 is powered down to reduce the airspeed of the parasite aircraft 100 and parasite aircraft 100 transitions from self-powered flight to being carried by carrier aircraft 200. After parasite aircraft 100 is secured to carrier aircraft 200, carrier aircraft 200 can reduce its speed if desired. Parasite aircraft 100 can then be transferred to a desired location and released. Carrier aircraft 200 is then free to fly another mission or to land.

System 10 provides a more efficient way to launch and retrieve parasite aircraft 100 compared to designing parasite aircraft 100 to have vertical take-off and landing (VTOL) capabilities. Including propulsion systems and controls that would enable parasite aircraft 100 to have VTOL adds significant weight, complexity, and expense that becomes a hindrance to parasite aircraft 100 during the majority of its mission. For example, taking off and landing is a fraction of the flight time for parasite aircraft 100. The majority of the time, parasite aircraft 100 operates in traditional forward flight. Carrying around the extra weight of the VTOL system would reduce the efficiency of parasite aircraft 100 during normal flight. In some aspects, inclusion of VTOL systems could result in a reduction in efficiency of up to 50-70%. Thus, system 10 described above provides a method by which parasite aircraft 100 can be deployed and retrieved vertically without needing its own VTOL systems.

Using maneuverable capture device 300 to guide cables 202 to parasite aircraft 100 from carrier aircraft 200 has numerous safety advantages. Mating two aircraft during flight can be challenging due to the dynamics involved in flight. Positioning two aircraft in close proximity to one another can be dangerous, especially when a collision is involved. Using maneuverable capture device 300 to ferry cables 202 to parasite aircraft 100 reduces risk of damaging parasite aircraft 100 and carrier aircraft 200 due to collision. Maneuverable capture device 300 is small and light weight compared to parasite aircraft 100. In the event of a collision between parasite aircraft 100 and maneuverable capture device 300, it is unlikely that parasite aircraft 100 will be damaged.

Figure 2:
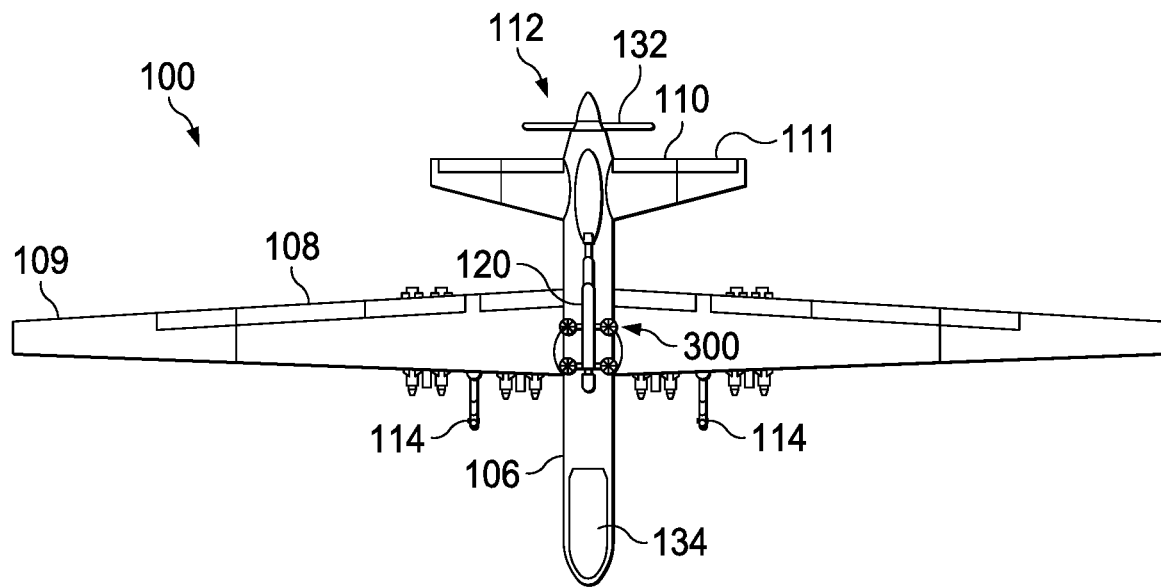
FIGS. 2-10 illustrate a parasite aircraft according to aspects of the disclosure.
Figure 3:
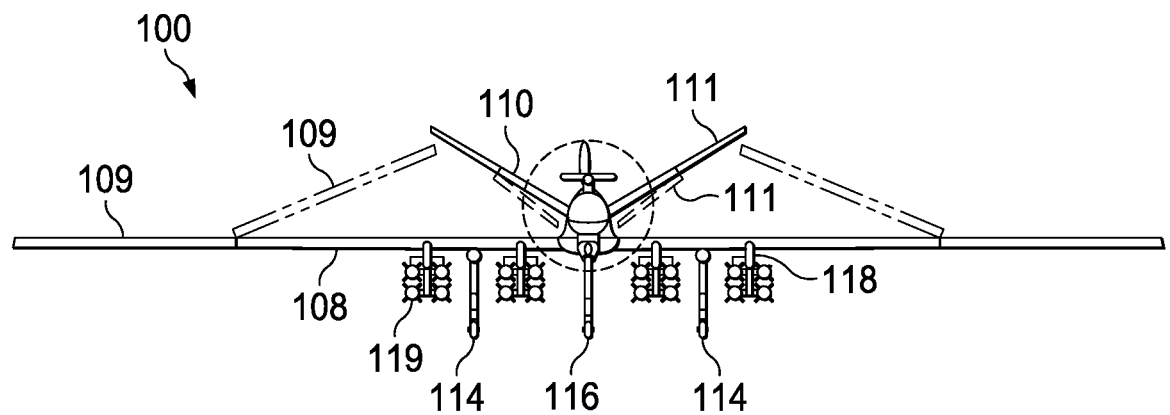
Figure 4:
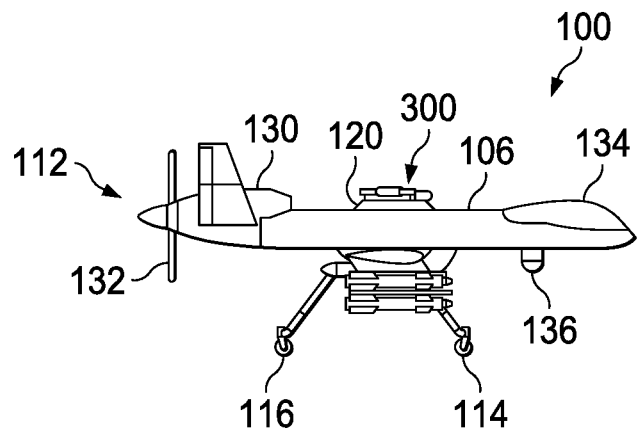
Figure 5:
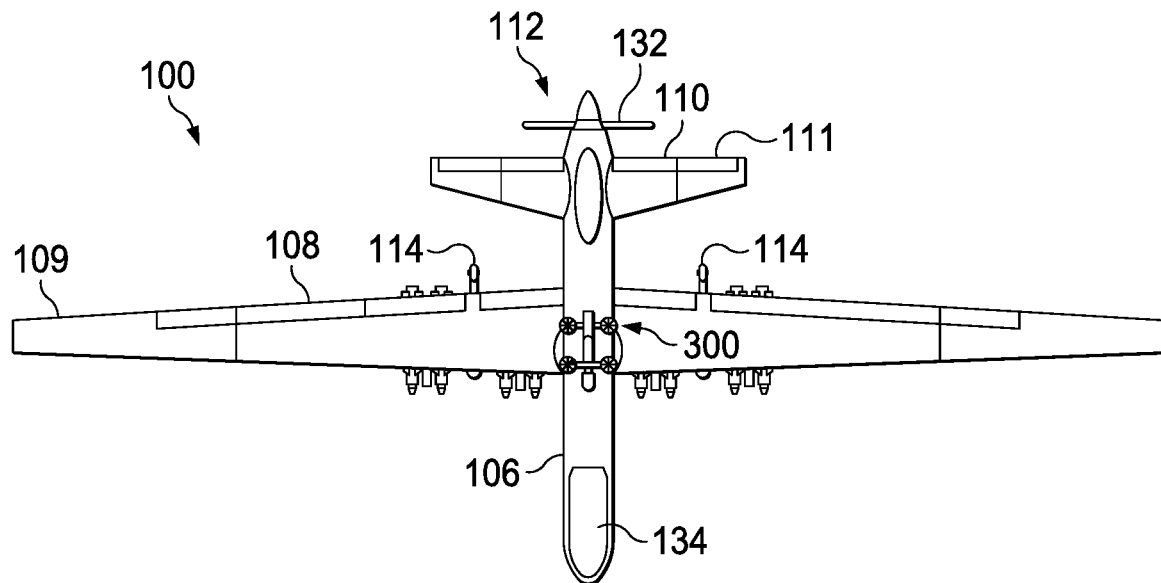
Figure 6:
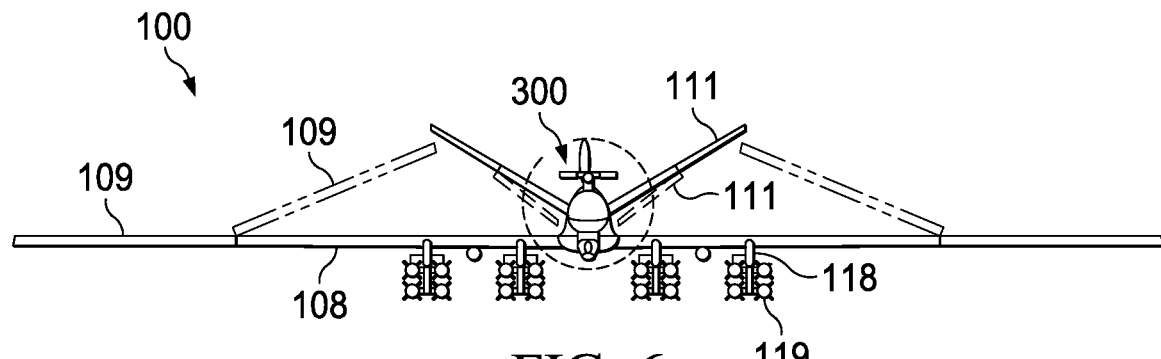
Figure 7:
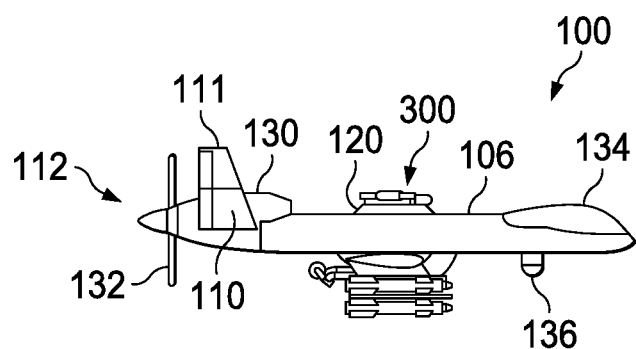
Figure 8:
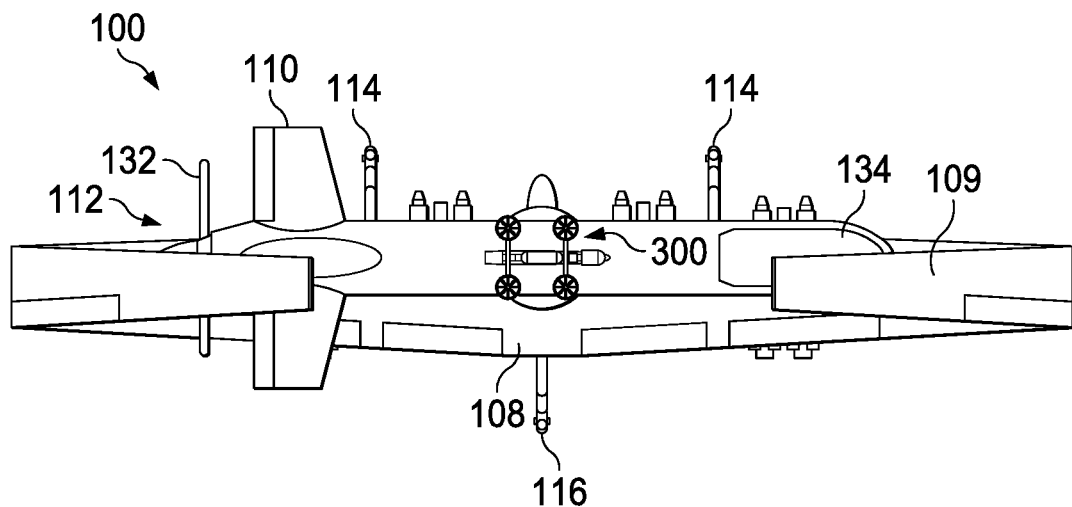
Figure 9:
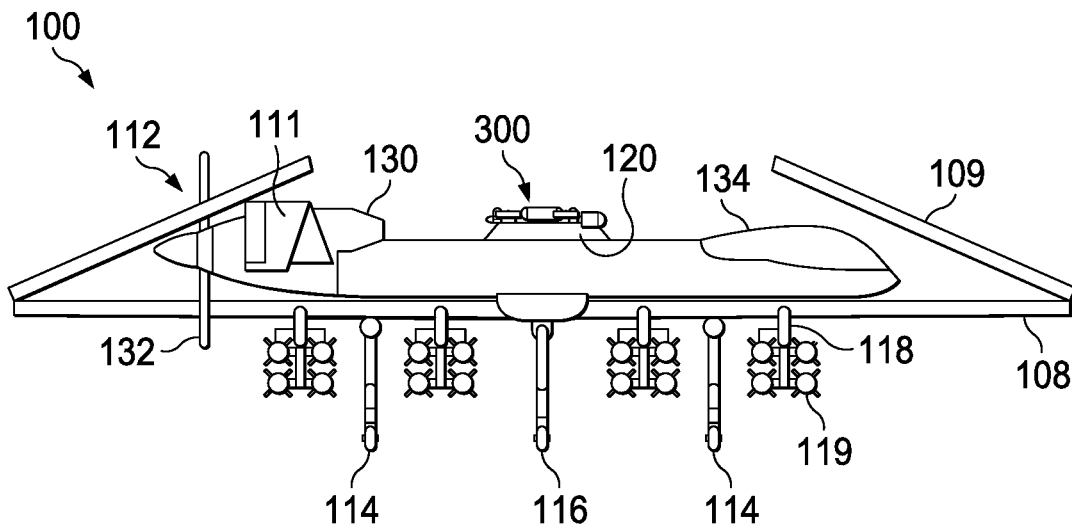
Figure 10:
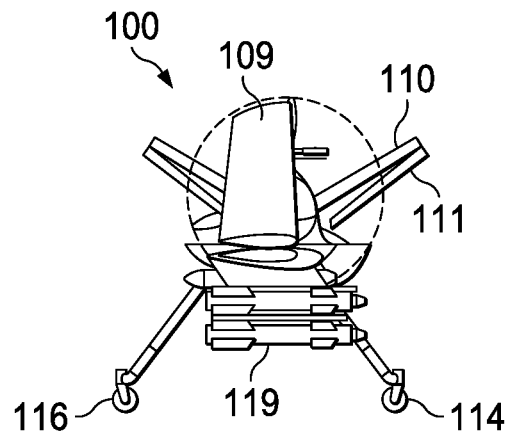

Referring now to FIGS. 2-10, parasite aircraft 100 is illustrated according to aspects of the disclosure. FIGS. 2-4 illustrate top, front, and side views, respectively, of parasite aircraft 100 with landing gear extended and maneuverable capture device 300 docked in dock 120. FIGS. 5-7 illustrate top, front, and side views, respectively, of parasite aircraft 100 with landing gear raised and maneuverable capture device 300 docked in dock 120. FIGS. 8-10 illustrate top, front, and side views, respectively, of parasite aircraft 100 in a folded or storage configuration with landing gear lowered and maneuverable capture device 300 docked in dock 120.

Parasite aircraft 100 includes a fuselage 106, wing 108, tail members 110, and a propulsion system 112. Wing 108 is set below fuselage 106 to allow fuselage 106 to rotate relative to wing 108. Rotating fuselage 106 to be generally parallel with a length of wing 108 enables parasite aircraft 100 to have a smaller footprint to take up less space for storage (e.g., see FIGS. 17 and 20). In other aspects, wing 108 can be mounted on top of fuselage 106. In some aspects, parasite aircraft 100 can have a fixed-wing design. In some aspects, parasite aircraft 100 could be any of a variety of aircraft that have been modified to include dock 120.

Wing 108 may also include end portions 109 that can fold during storage to further minimize a footprint of parasite aircraft 100. End portions 109 are illustrated in FIG. 3 with solid lines in an unfolded position and with dashed lines in a folded position. End portions 109 fold up away from the ground and toward fuselage 106. Similarly, tail members 110 may include end portions 111 that can fold during storage. End portions 111 are illustrated in FIG. 3 with solid lines in an unfolded position and with dashed lines in a folded position. End portions 111 fold down toward the ground and toward fuselage 106. Alternatively, end portions 111 could fold up away from the ground and toward fuselage 106.

Wing 108 also serves as a mounting point for landing gear 114, 116 and pylons 118. As illustrated in FIGS. 3 and 4, a pair of front gear 114 and a rear gear 116 are mounted to wing 108. Mounting gear 114, 116 to wing 108 allows fuselage 106 to be rotated into the storage position while gear 114, 116 remain in the extended position (e.g., see FIGS. 8-10). With gear 114, 116 still extended in the stored position, parasite aircraft 100 can be more easily moved.

Pylons 118 provide attachment points for various payloads. For example, payloads can include sensory equipment, munitions, fuel tanks, supplies, and the like. In FIGS. 2-10, a plurality of munitions 119 are shown attached to a plurality of pylons 118.

Propulsion system 112 is positioned in an aft portion of fuselage 106. Propulsion system 112 includes a nacelle 130 that houses an engine that drives a proprotor 132. In other aspects, parasite aircraft 100 could be powered by various other types of propulsion systems. In other aspects, propulsion system 112 could be wing mounted, mounted to the front of fuselage 106, or combinations aft, front, and wing-mounted.

As illustrated in FIGS. 2-10, parasite aircraft 100 includes a canopy 134. In some aspects, canopy 134 houses various electronics. For example, canopy 134 may house electronics that automate control of parasite aircraft 100 or that allow remote control of parasite aircraft 100. Canopy 134 can also house various sensors and equipment (e.g., radar, LIDAR, GPS, cameras, etc.) used to help guide maneuverable capture device 300 to parasite aircraft 100. In some aspects, the sensors and equipment may be housed in fuselage 106. In some aspects canopy 134 houses a cockpit for a pilot.

Parasite aircraft 100 includes a camera module 136. As illustrated in FIG. 4, camera module 136 is mounted to an underside of fuselage 106. In other aspects, camera module 136 could be mounted to other parts of fuselage 106 or to wing 108. In some aspects, parasite aircraft 100 can include multiple camera modules 136. Camera module 136 is configured to turn 360 degrees about a first axis and 180 degrees about a second axis to allow camera module to take photos or videos from a variety of angles.

FIGS. 5-7 illustrate top, front, and side views, respectively, of parasite aircraft 100 configured for flight with landing gear 114, 116 retracted. The pair of front gear 114 fold back to the position shown in FIGS. 5 and 7 and rear gear 116 folds forward toward camera module 136. In other aspects, other configurations of landing gear could be used.

FIGS. 8-10 illustrate top, front, and side views, respectively, of parasite aircraft 100 in the folded position with fuselage 106 aligned with wing 108 and end portions 109, 111 folded. In some aspects the process to transition parasite aircraft 100 to the folded position begins by rotating fuselage 106 to be generally parallel with wing 108 as illustrated in FIGS. 8-10. Fuselage 106 is generally parallel with wing 108 when a central axis running through fuselage 106 is within fifteen degrees of an axis running through wing 108. To facilitate rotation of fuselage 106 relative to wing 108, fuselage 106 is secured to wing 108 via a single pivot point. In some aspects, a ring gear may be used in conjunction with an electric motor to control rotation of fuselage 106. In some aspects, rotation of fuselage 106 may be done manually by one or more ground personnel. One or more locking mechanisms can be actuated to unlock fuselage 106 to permit fuselage 106 to rotate relative to wing 108. Personnel can then manually, or with the assistance of equipment, rotate fuselage 106 to the position shown in FIGS. 8-10. Once fuselage 106 is in position, the one or more locking mechanisms are locked to secure fuselage 106 in place. Locking mechanisms may include pins, latches, locks, and the like. As fuselage 106 rotates into position, it may be necessary for proprotor 132 to rotate to allow the rotor blades to clear wing 108. In some aspects, the rotor blades are manually rotated by personnel. In some aspects, personnel rotate the rotor blades using a powered hand tool that attaches to a gearbox of the engine to rotate the rotor blades. In some aspects, the rotor blades are automatically rotated by a rotor positioning unit that is a part of propulsion system 112.

Once fuselage 106 is in position, end portions 109, 111 are folded. Proprotor 132 should be positioned so that the rotor blades do not hit wing 108 and end portion 109. In some aspects, proprotor 132 is locked into place so that the rotor blades do not contact end portion 109 or wing 108. To transition parasite aircraft 100 back to the flight-ready configuration, the steps outlined above are reversed. In aspects where rotation of fuselage 106 is automated, the transition of parasite aircraft 100 from the storage configuration to the flight-ready configuration can be done after carrier aircraft 200 has lifted parasite aircraft 100 into the air. Transitioning parasite aircraft 100 in the air may be desirable in situations where parasite aircraft 100 needs to be launched quickly or in situations where ground space is limited and there is not enough room for parasite aircraft 100 to unfold.

Figure 11:
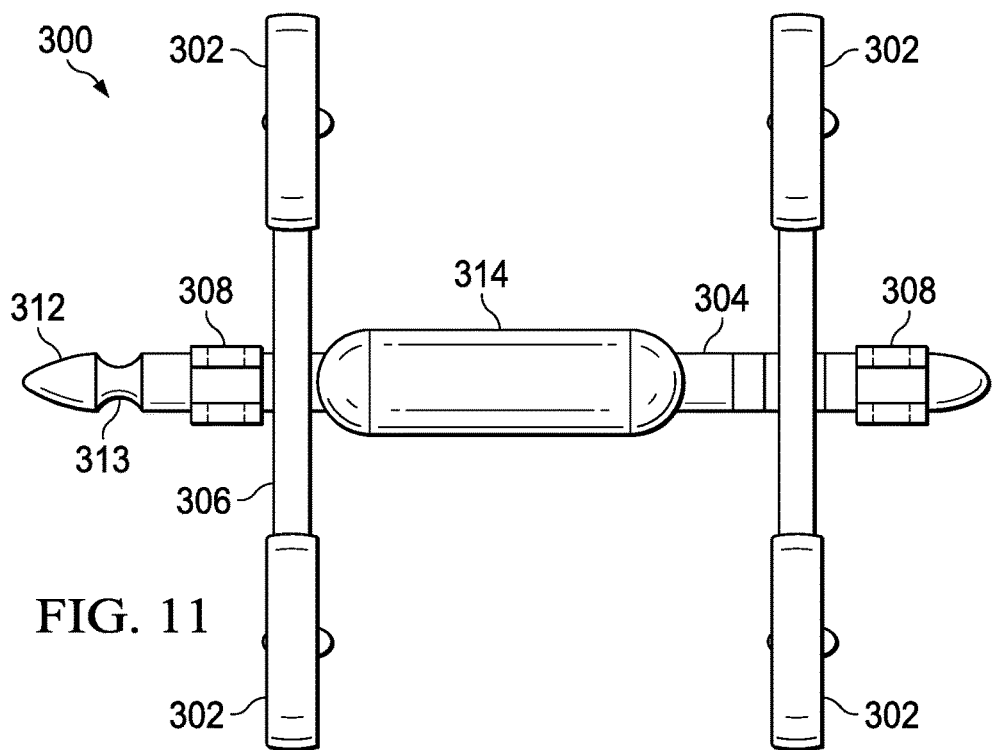
FIGS. 11-16 illustrate a maneuverable capture device according to aspects of the disclosure.
Figure 12:
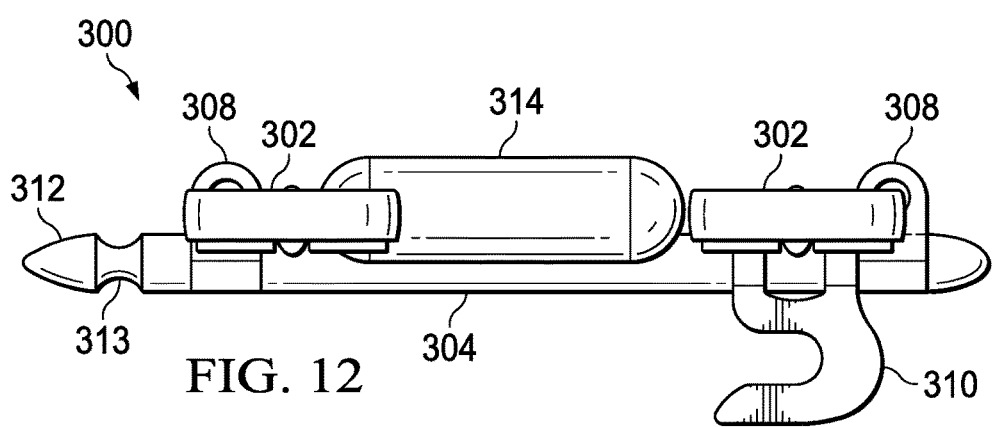
Figure 13:
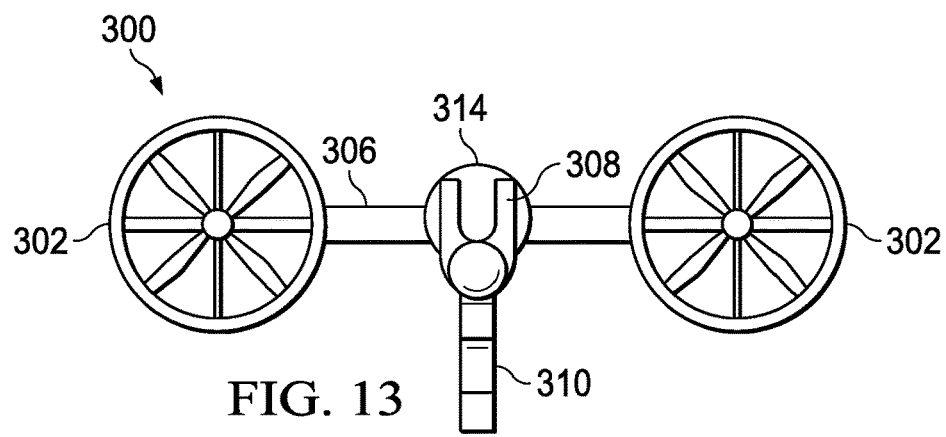

Referring now to FIGS. 11-16, maneuverable capture device 300 is illustrated. Maneuverable capture device 300 includes a plurality of rotors 302, a frame 304, cross-supports 306, and a pair of attachment points 308. As illustrated in FIGS. 11-16, maneuverable capture device 300 includes four rotors 302. In other aspects, maneuverable capture device 300 could include more or fewer rotors 302 (e.g., three, five, six, eight, etc.). Rotors 302 are connected to frame 304 by cross-supports 306. In some aspects, rotors 302 are ducted fans powered by electric motors. Each rotor 302 is configured to pivot about an axis extending through a length of the cross-support 306 to which it is attached (e.g., FIG. 11 shows rotors 302 oriented in a first direction and FIG. 12 shows rotors 302 oriented in a second direction perpendicular to the first direction). Controlling an amount and direction of thrust generated by each rotor 302 allows maneuverable capture device 300 to use thrust vectoring to precisely fly through the air. Controlling a direction of the thrust of rotors also enables maneuverable capture device 300 to attain the high speeds needed to match the speed of parasite aircraft 100 during capture. In some aspects, maneuverable capture device 300 can be controlled in a similar fashion to a quad-rotor drone. As illustrated in FIGS. 11-16, maneuverable capture device 300 does not include wings, fins, or the like. In other aspects, maneuverable capture device 300 may include one more wings or fins to improve maneuverable capture device 300's flight characteristics.

Each attachment point 308 is configured to secure an end of cables 202 from carrier aircraft 200. As illustrated in FIGS. 11-16, each attachment point 308 is a pair of eyelets. In other aspects, attachment points 208 could be other types of connections (e.g., threaded, slotted, etc.). Cables 202 can be looped through the pair of eyelets or a pin can be inserted into the pair of eyelets and cables 202 can be secured to the pin or looped around the pin. In some aspects, cables 202 supply electrical power to maneuverable capture device 300. Cables 202 can provide lifting capability and electricity via one cable or cables 202 can include two or more cables that are run in parallel. For example, cables 202 may include a steel cable for lifting parasite aircraft 100 and an electrical cable that provides electrical power to maneuverable capture device 300.

Figure 14:
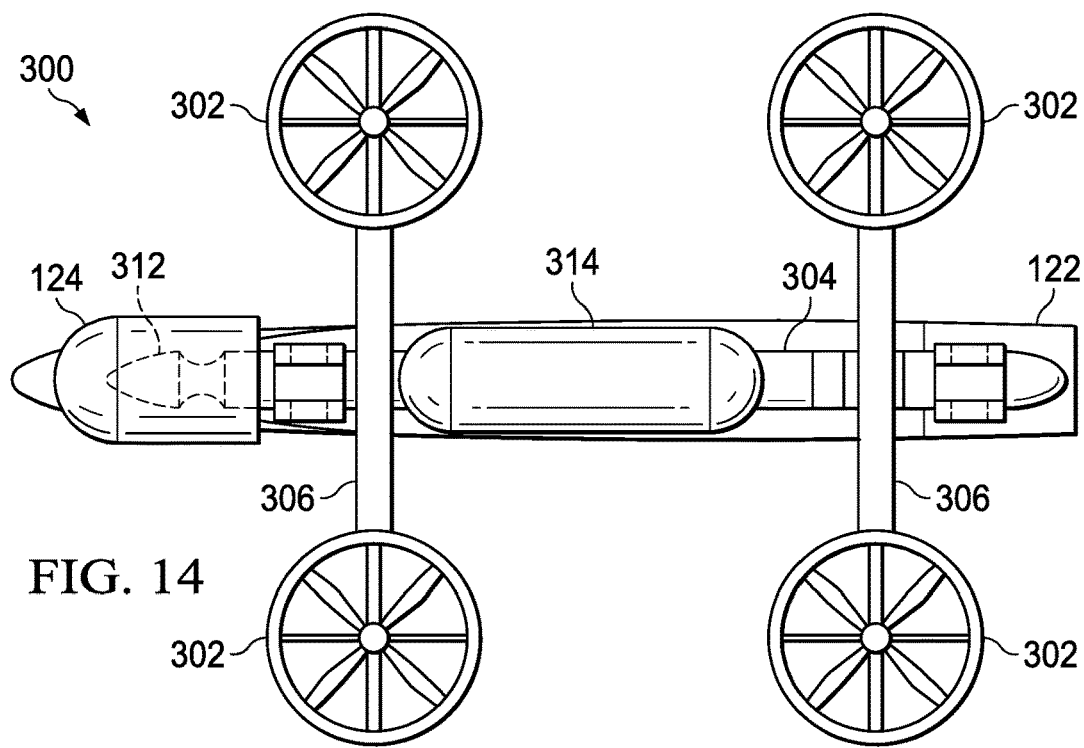
Figure 15:
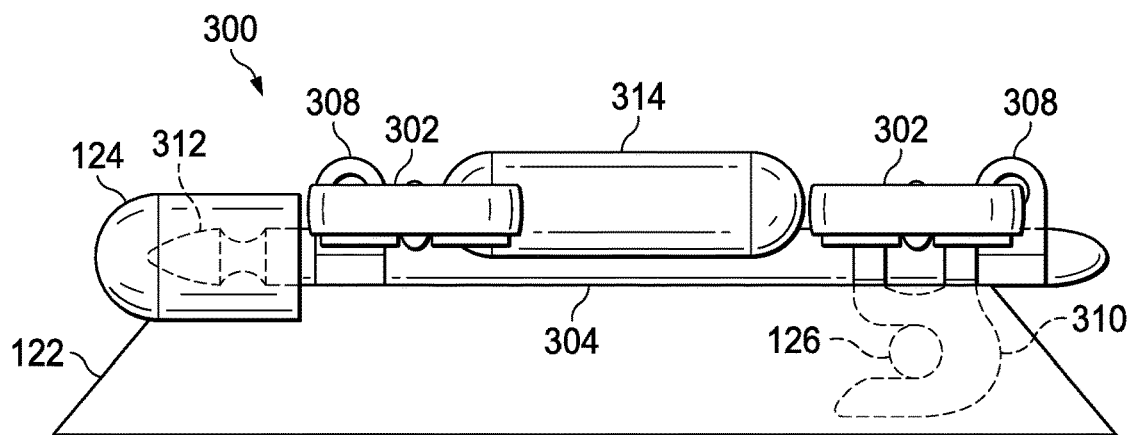
Figure 16:
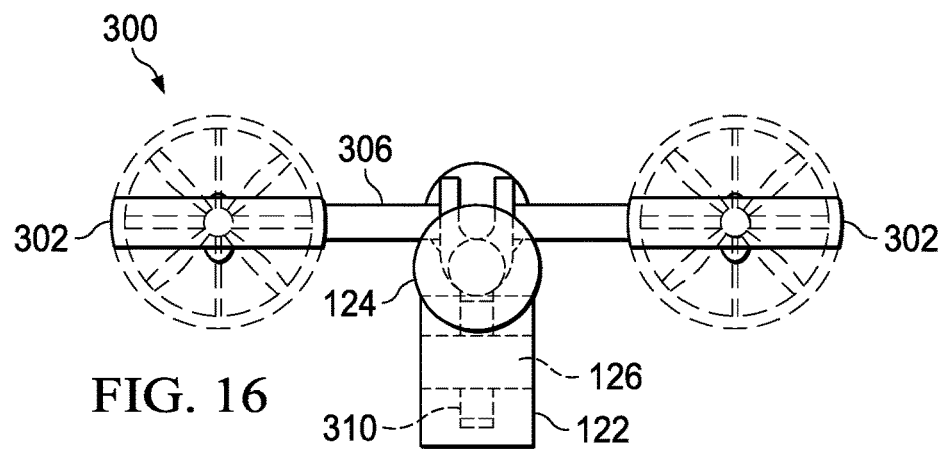

Maneuverable capture device 300 includes features that allow maneuverable capture device 300 to securely attach to parasite aircraft 100. For example, maneuverable capture device 300 includes attachment features that interact with dock 120 to allow maneuverable capture device 300 to securely attach to parasite aircraft 100. As illustrated in FIGS. 14-16, the attachment features include a hook 310 and a rod 312. In some aspects, the attachment features could include pins, latches, locks, eyelets, and the like.

FIGS. 14-16 illustrate maneuverable capture device 300 secured in dock 120 of parasite aircraft 100. Dock 120 includes a base 122 that attaches to fuselage 106, a housing 124 and a pin 126. Dock 120 is disposed on a dorsal side of parasite aircraft 100. In some aspects, dock 120 is positioned on top of fuselage 106 and generally above a center of gravity of parasite aircraft 100.

Housing 124 is configured to receive a portion of maneuverable capture device 300 to secure maneuverable capture device 300 to parasite aircraft 100. In some aspects, housing 124 is configured to receive rod 312. In some aspects, housing 124 may include a bell-shaped or conical-shaped opening that helps guide rod 312 into housing 124. In some aspects, housing 124 may include a ball-lock type connector that includes sprung ball pins that press into groove 313 of rod 312 to secure rod 312 within housing 124. Hook 310 is configured to hook around pin 126. In some aspects, dock 120 and maneuverable capture device 300 may include additional features, such as locks, latches, pins, and the like, that secure or lock maneuverable capture device 300 to dock 120.

Maneuverable capture device 300 can also include a housing 314 that houses electronics, electrical motors, and controls to operate maneuverable capture device 300. Electrical power for electronics, motors, and controls within housing 314 can be supplied from carrier aircraft 200 via cables 202.

Figure 17:
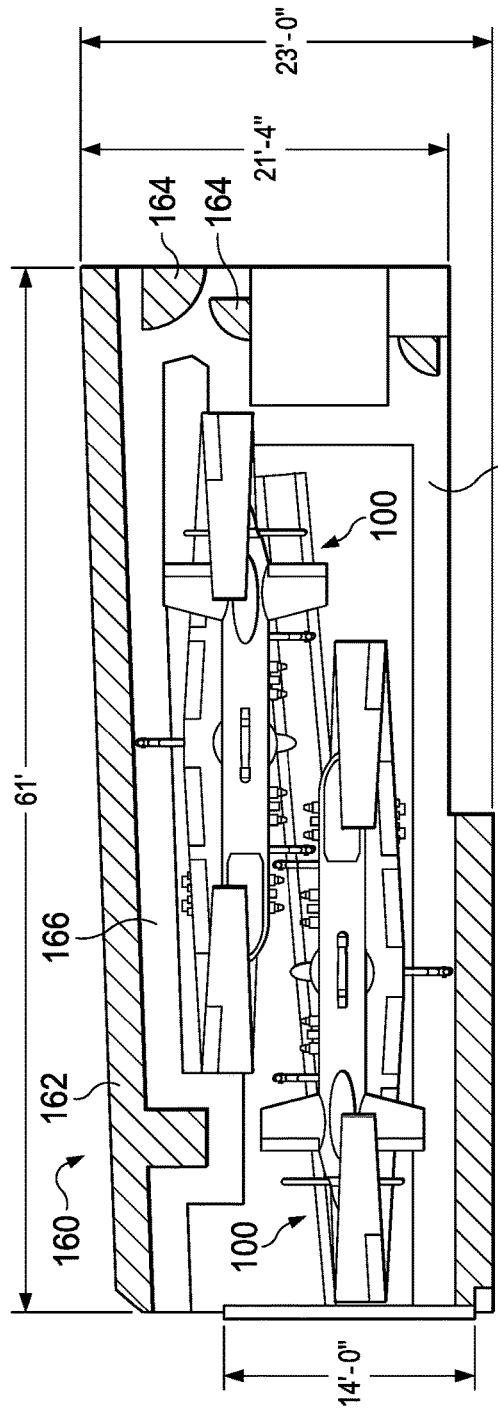
FIG. 17 illustrates two parasite aircraft stored in a hangar according to aspects of the disclosure.

Referring now to FIG. 17, two parasite aircraft 100 are illustrated stored in a hangar 160. Hangar 160 is representative of a standard hangar present on a ship, such as a guided missile destroyer. Hangar 160 is bordered by walls 162. Obstructions 164, such as shelves, doors, and the like, limit an amount of space available within hangar 160. In some aspects, hangar 160 includes areas 166 that are to remain largely unoccupied to allow pathways for people to walk. As illustrated in FIG. 17, hangar 160 has a length of approximately eighty one feet and a width that varies between approximately twenty one feet and twenty three feet. In some aspects, parasite aircraft 100 is designed to fit within hangar 160 when in the folded position. As illustrated in FIG. 17, two parasite aircraft 100 can fit within hangar 160.

Figure 18:
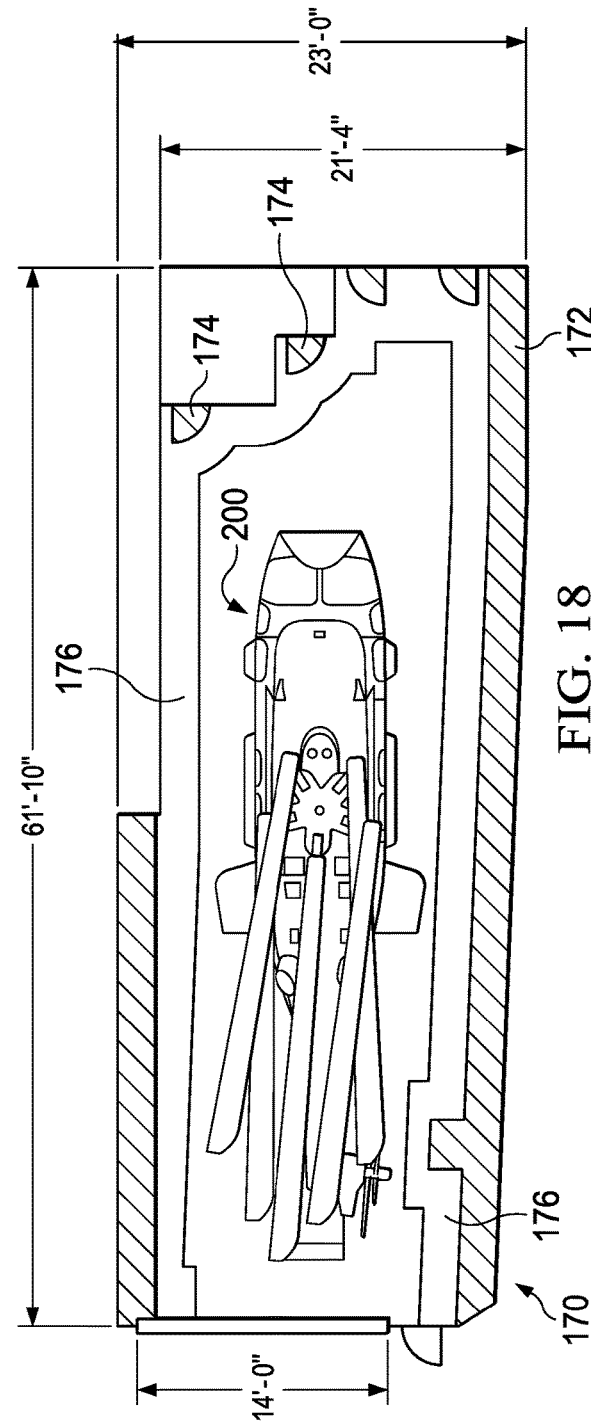
FIG. 18 illustrates a carrier aircraft stored in a hangar according to aspects of the disclosure.

Referring now to FIG. 18, carrier aircraft 200 is illustrated stored in a hangar 170. Hangar 170 is bordered by walls 172. Obstructions 174, such as shelves, doors, and the like, limit an amount of space available within hangar 170. In some aspects, hangar 170 includes areas 176 that are to remain largely unoccupied to allow pathways for people to walk. As illustrated in FIG. 17, hangar 170 has a length of approximately eighty two feet and a width that varies between approximately twenty one feet and twenty three feet. In some aspects, carrier aircraft 200 is chosen so that it fits within hangar 170. As illustrated in FIG. 18, carrier aircraft 200 is a helicopter, such as a Bell Helicopter 525, that includes foldable rotor blades and a foldable nose cone.

Figure 19:
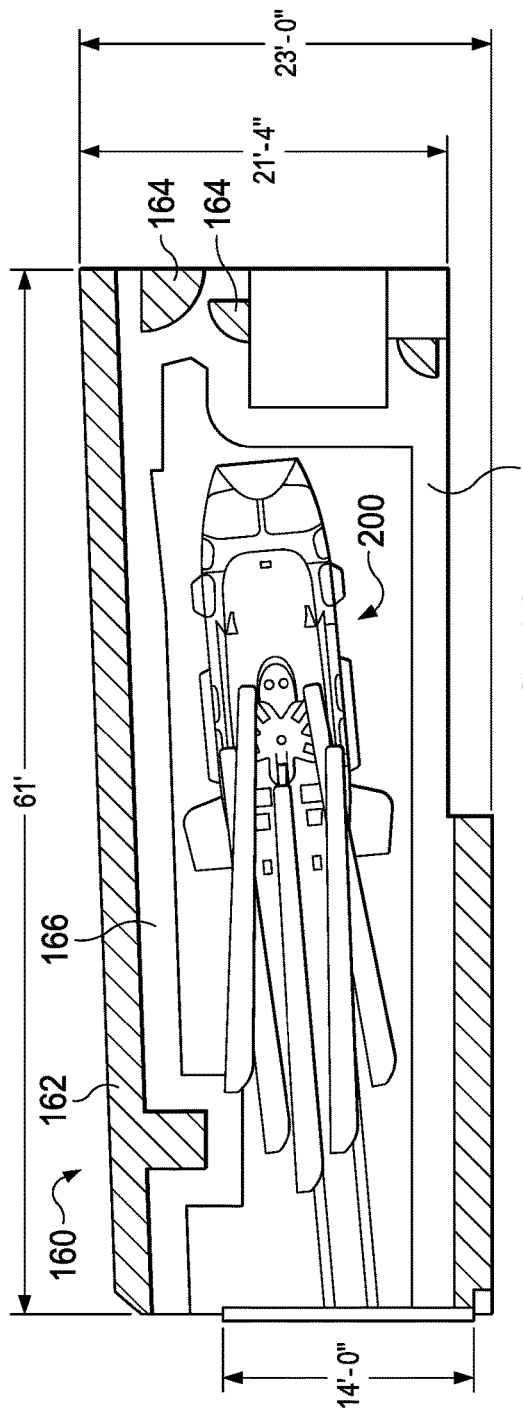
FIG. 19 illustrates a carrier aircraft stored in the hangar of FIG. 16 according to aspects of the disclosure.
Figure 20:
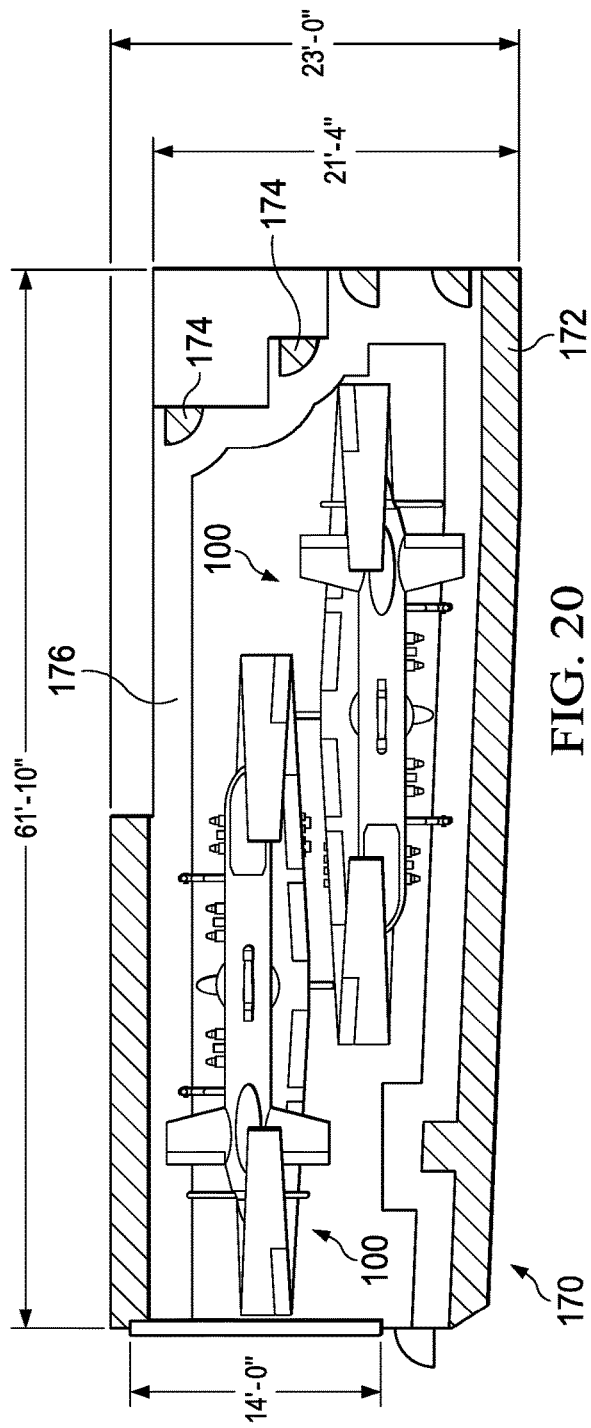
FIG. 20 illustrates two parasite aircrafts stored in the hangar of FIG. 17 according to aspects of the disclosure.

FIGS. 19 and 20, illustrate carrier aircraft 200 stored in hangar 160 and two parasite aircraft 100 stored in hangar 170. The compact design of parasite aircraft 100 offers the ability to store multiple aircraft in a space where even a single, non-foldable aircraft would not fit.

Figure 21:
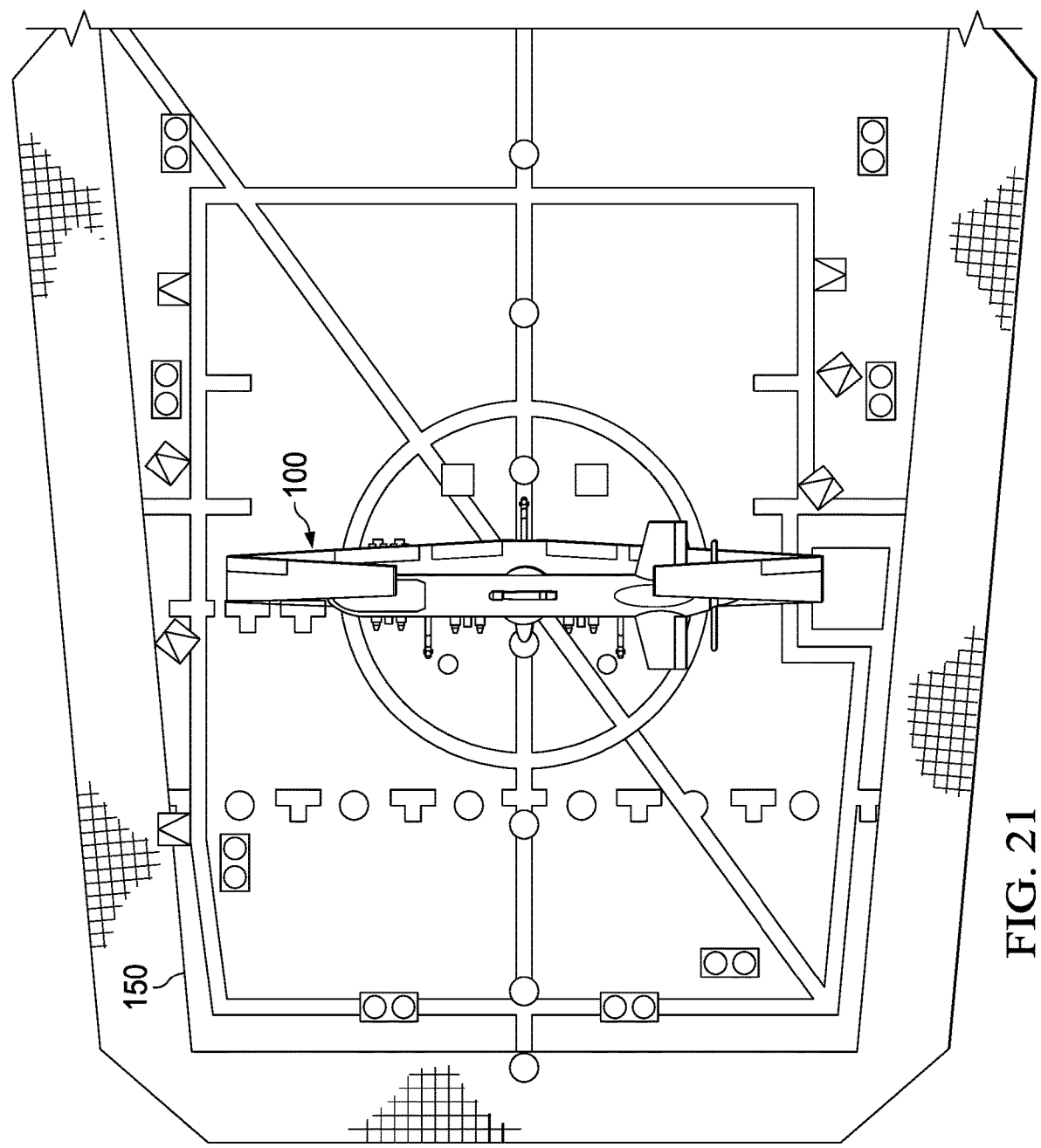
FIGS. 21 and 22 illustrate a parasite aircraft deployed on deck of a ship according to aspects of the disclosure.
Figure 22:
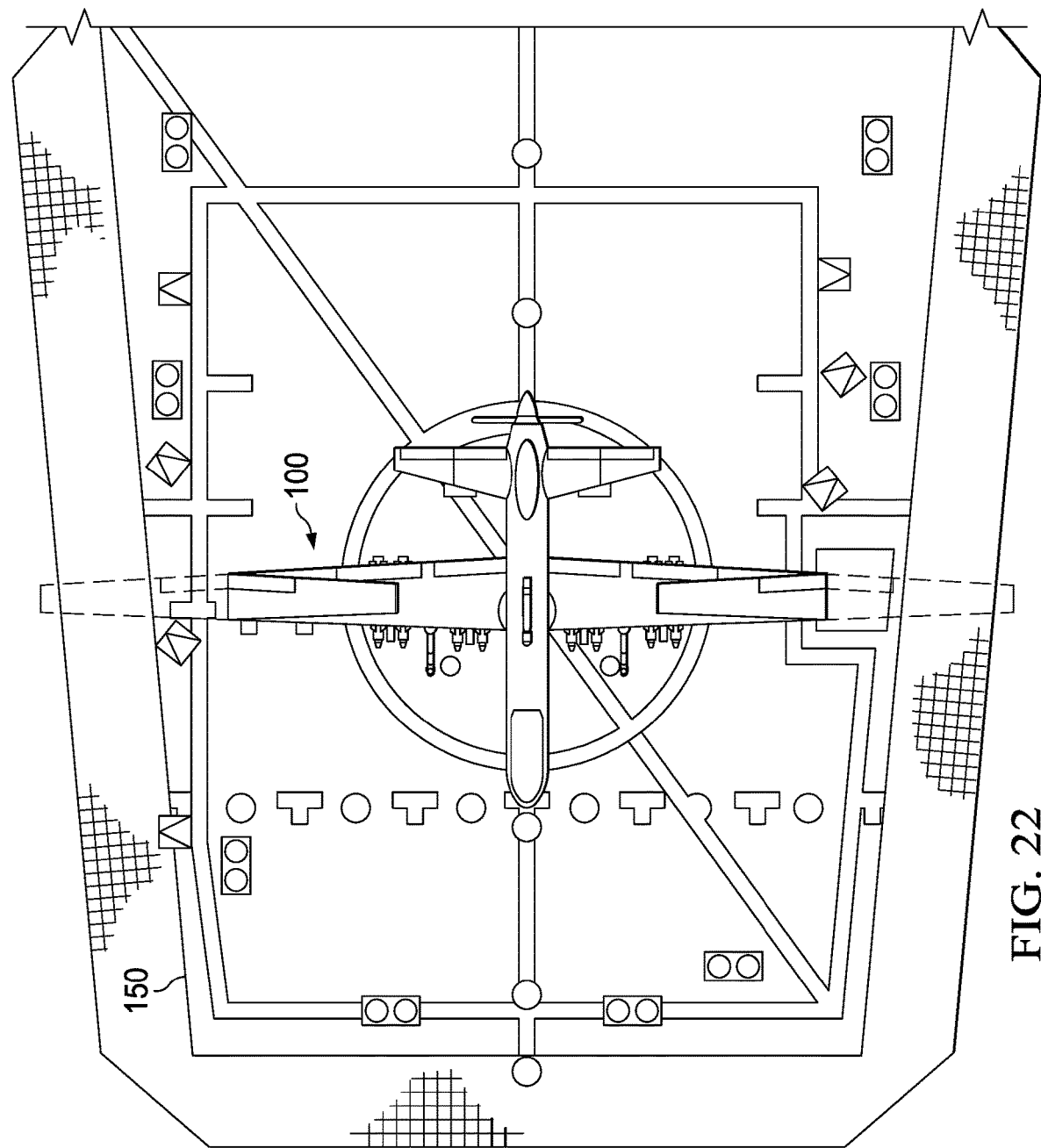

Referring now to FIG. 21, parasite aircraft 100 is illustrated in the storage configuration and positioned on a deck 150 of a ship, such as a guided missile destroyer. In some aspects, parasite aircraft 100 is removed from hangar 160 or 170 and positioned on deck 150 as illustrated. To prepare parasite aircraft 100 for deployment, end portions 109 of wing 108 and end portions 111 of tail members 110 are unfolded and fuselage 106 is rotated into the flight-ready configuration. FIG. 22 illustrates a transitionary position of parasite aircraft 100 with end portions 109 still folded and end portions 111 unfolded.

Referring now to FIGS. 23-34, a method of deploying parasite aircraft 100 is illustrated. The method begins by positioning parasite aircraft 100 on a loading surface 180. In some aspects, parasite aircraft 100 is removed from storage on a ship, such as hangars 160 or 170. In some aspects, parasite aircraft 100 is stored at a land-based location. Land-based locations could include an air base, a mobile command center, a flat-bed trailer, a roof of a building, or the like. Loading surface 180 is an area large enough for carrier aircraft 200 to position itself over parasite aircraft 100. In some aspects, loading surface 180 is deck 150 of a ship. In some aspects, loading surface 180 may comprise any open area of land such as a field, parking lot, rooftop, clearing, or the like.

Figure 23:
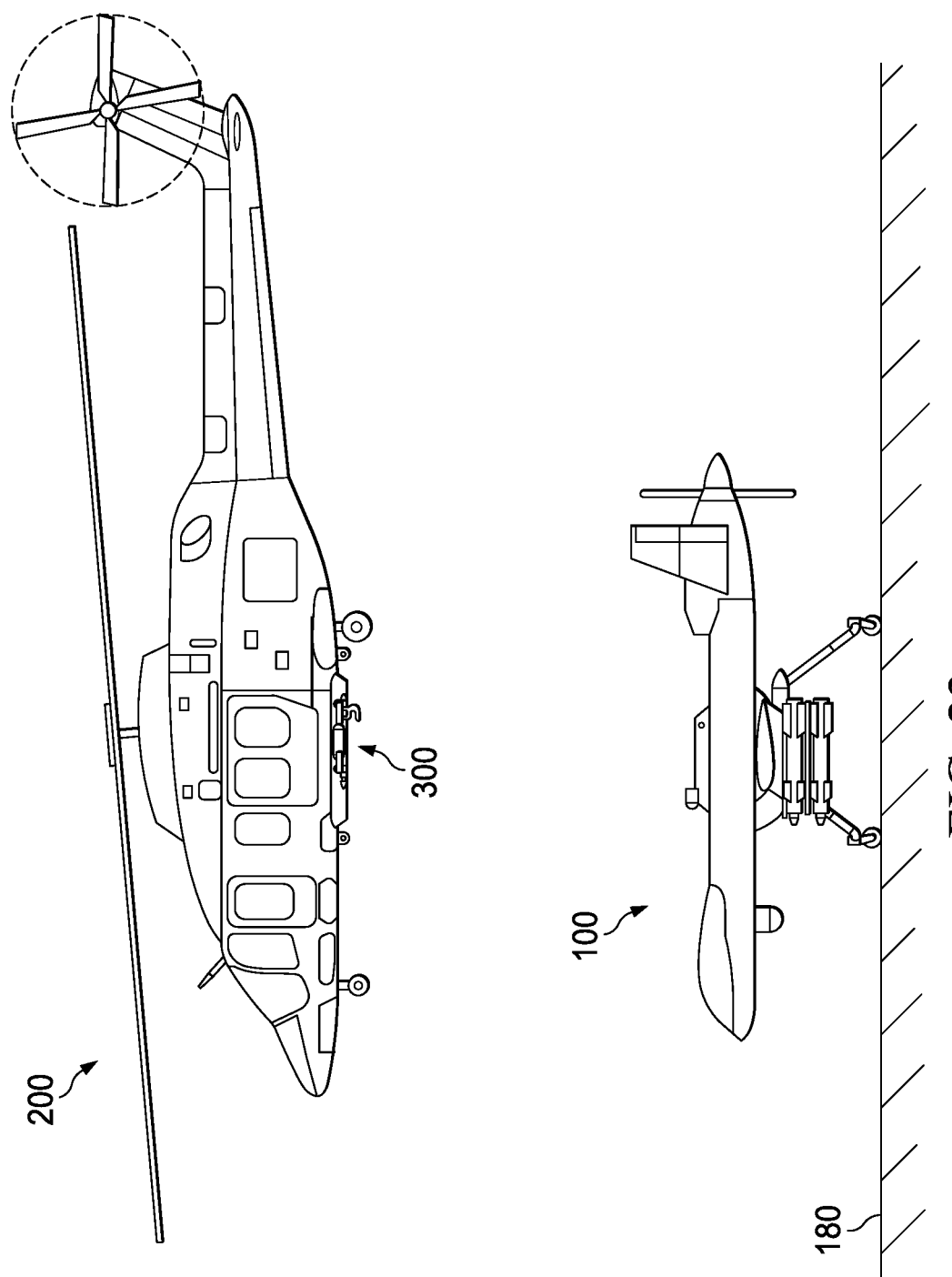
Figure 24:
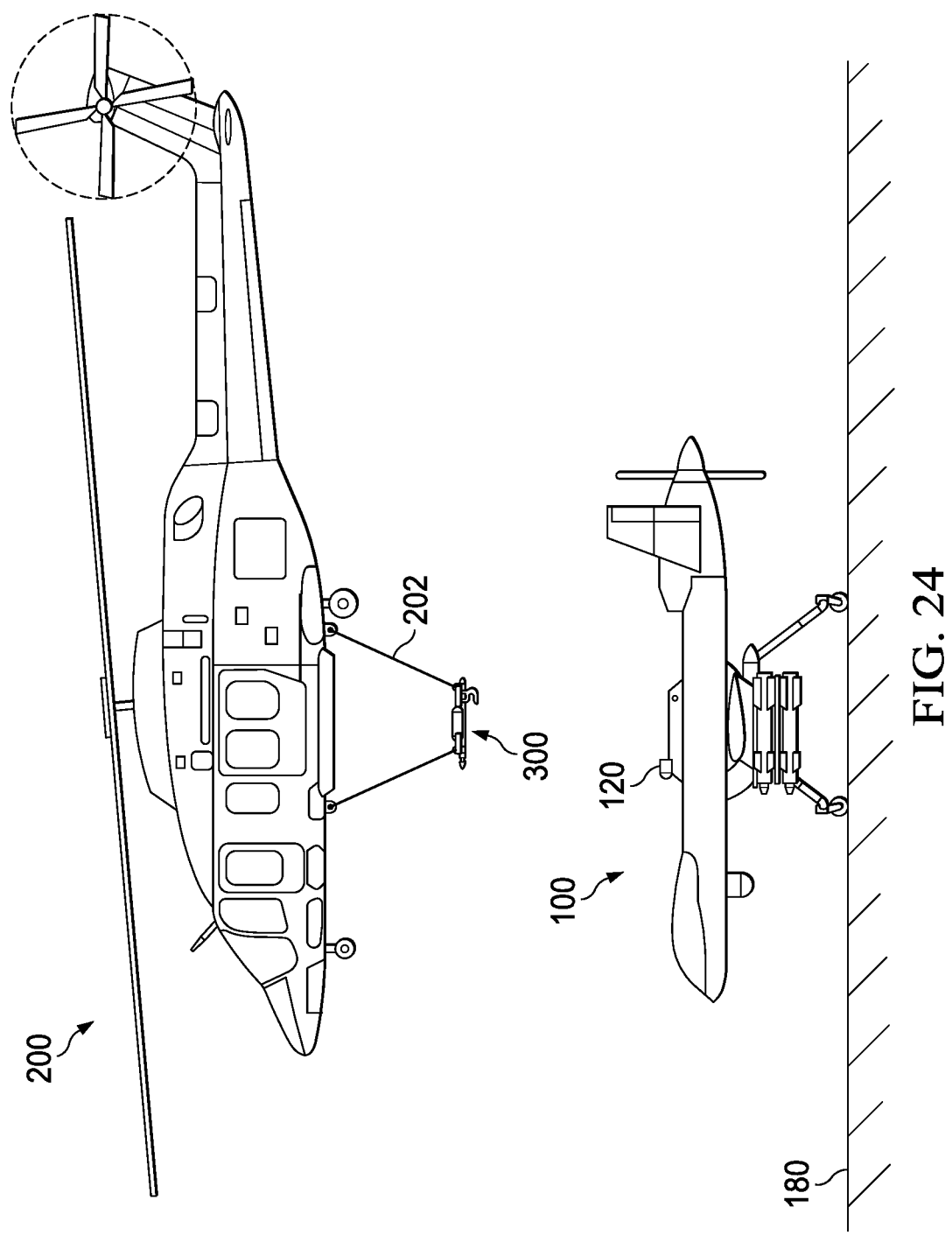
Figure 25:
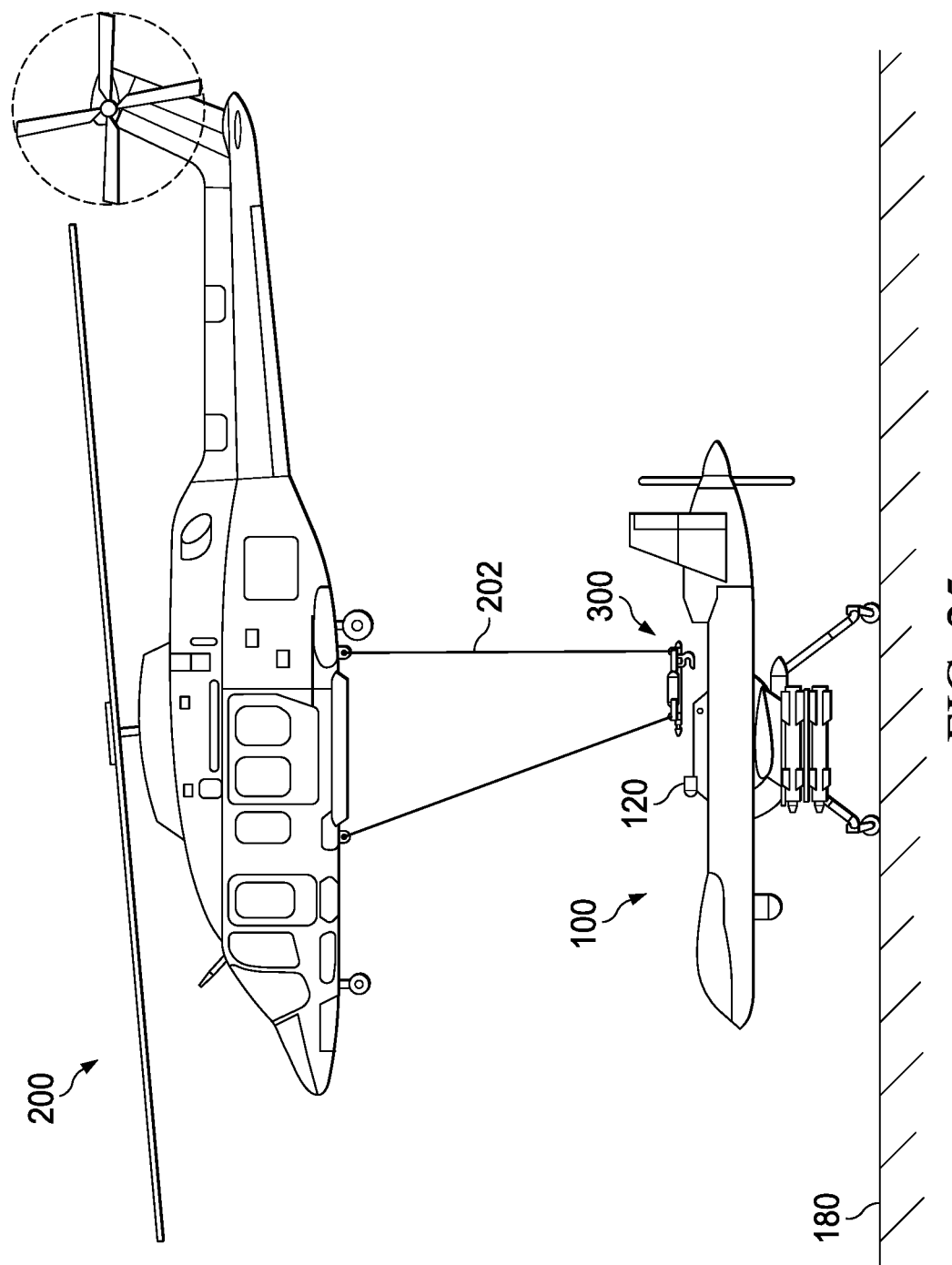
Figure 26:
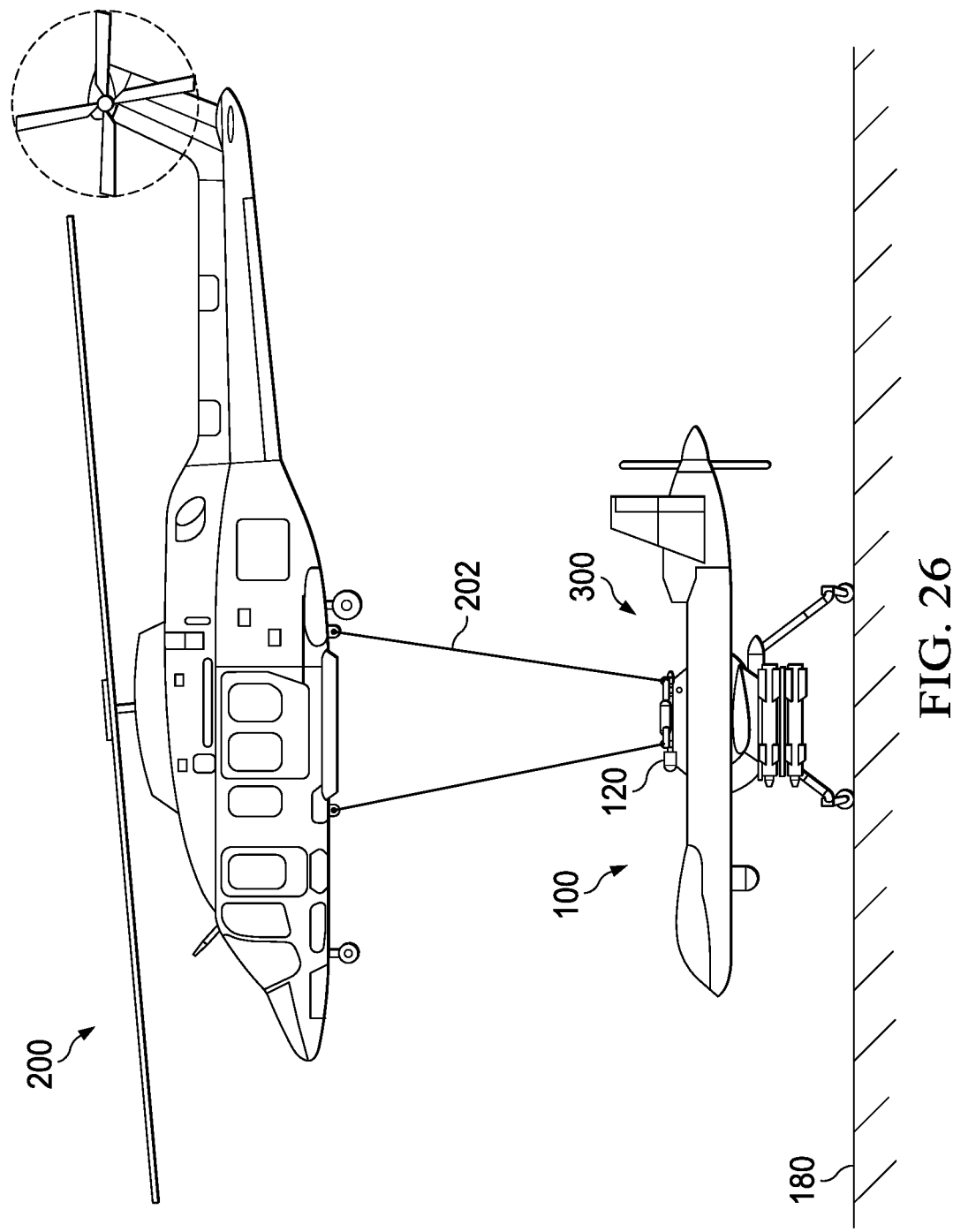
Figure 27:
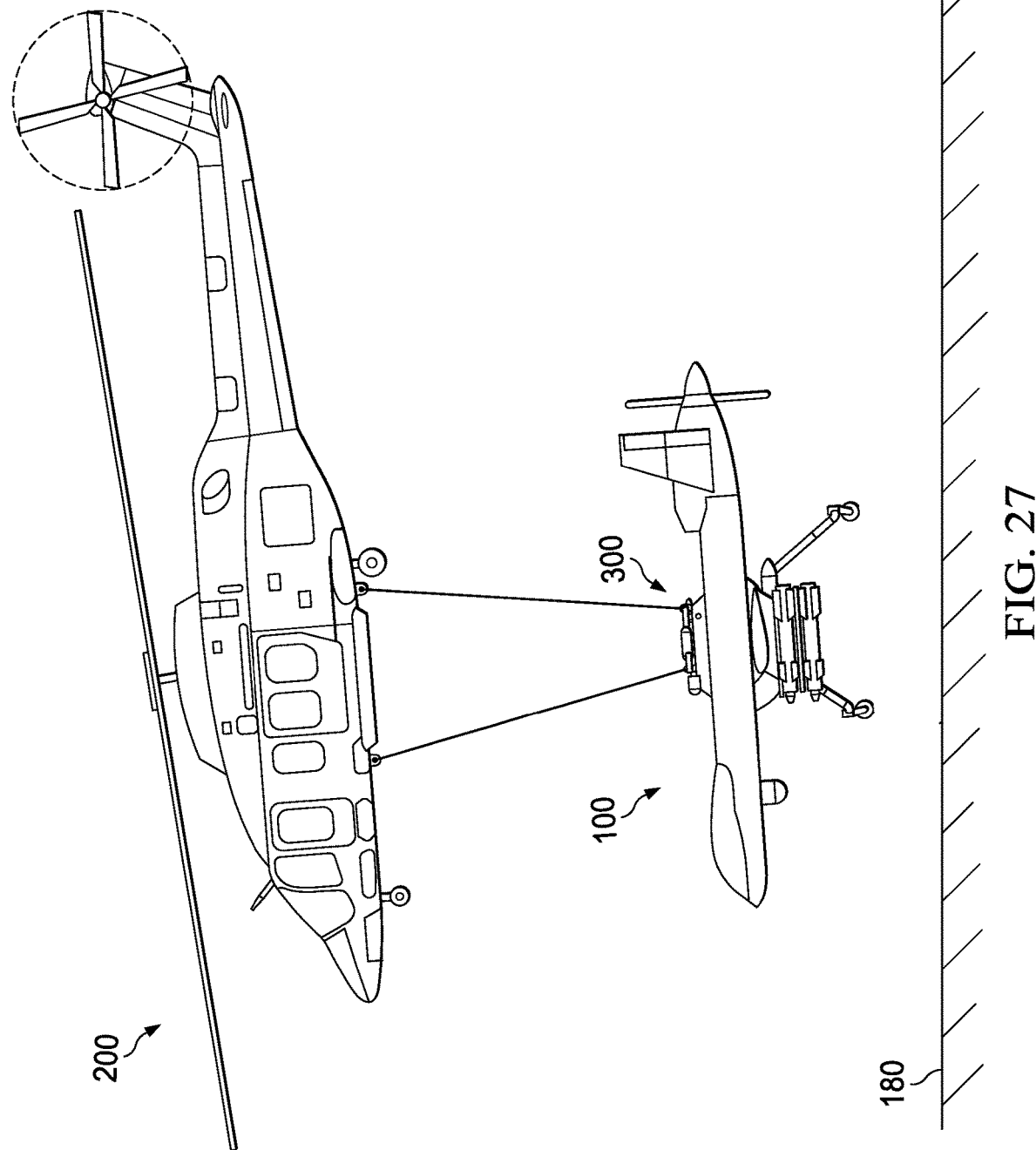
Figure 28:
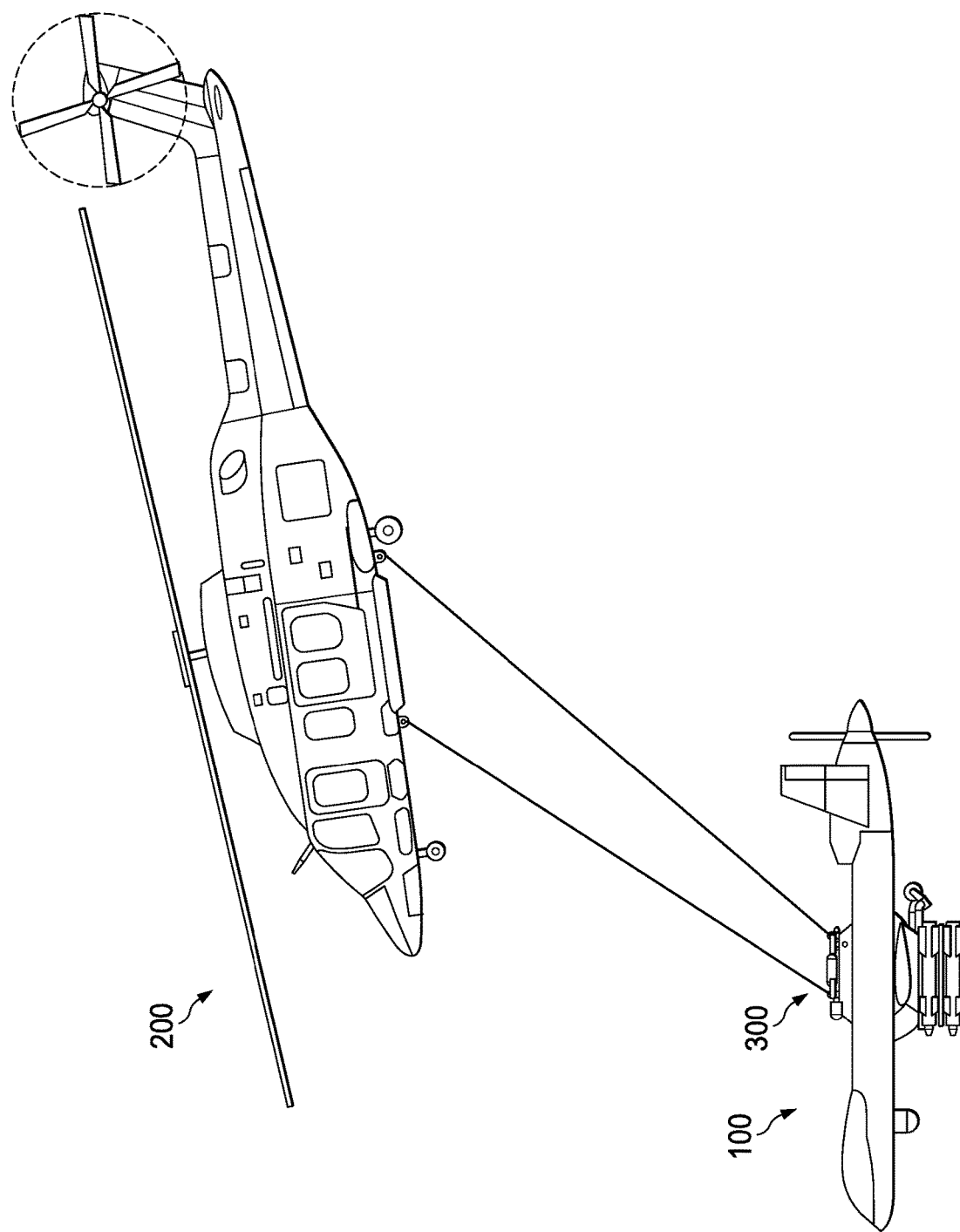
Figure 29:
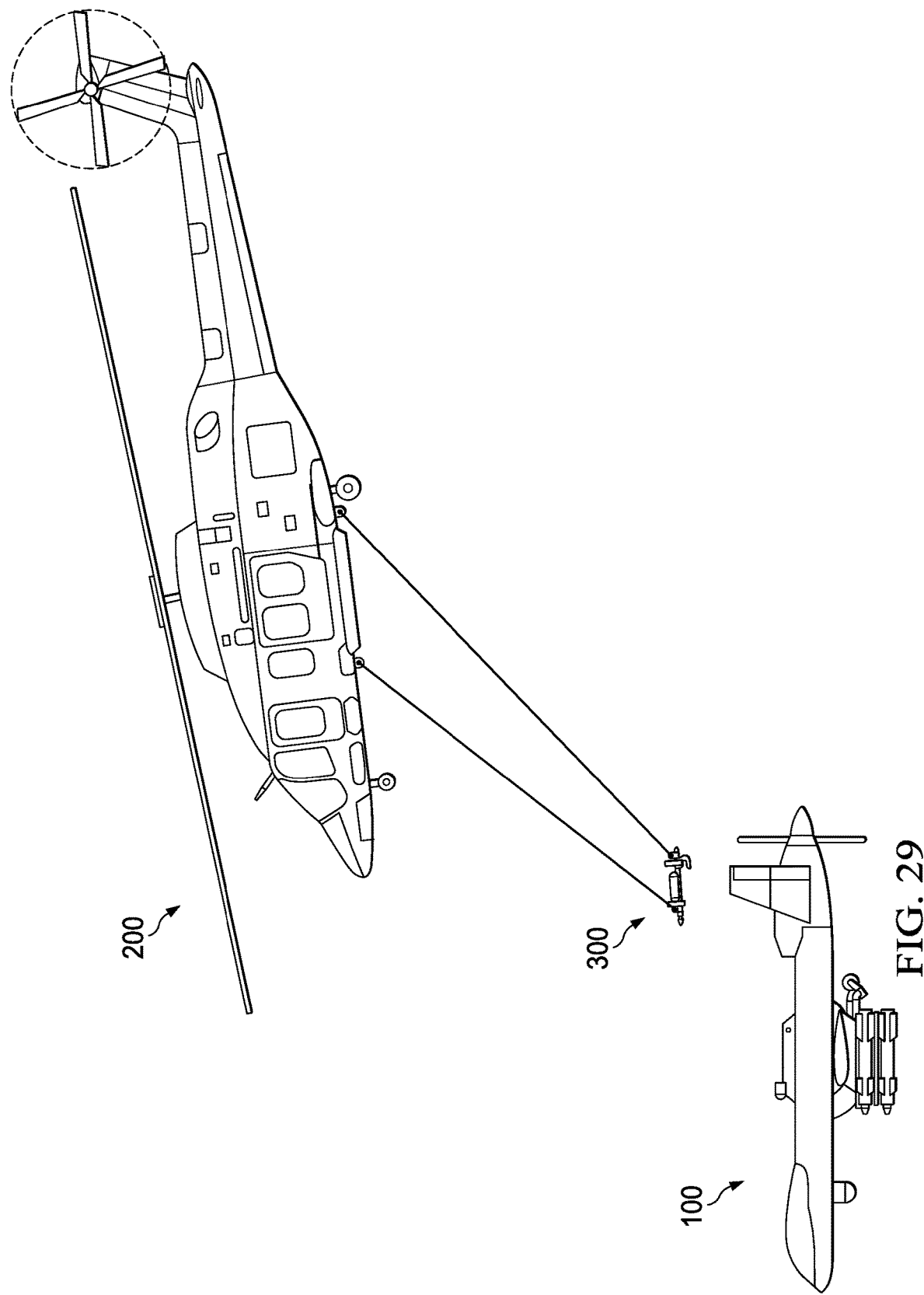
Figure 30:
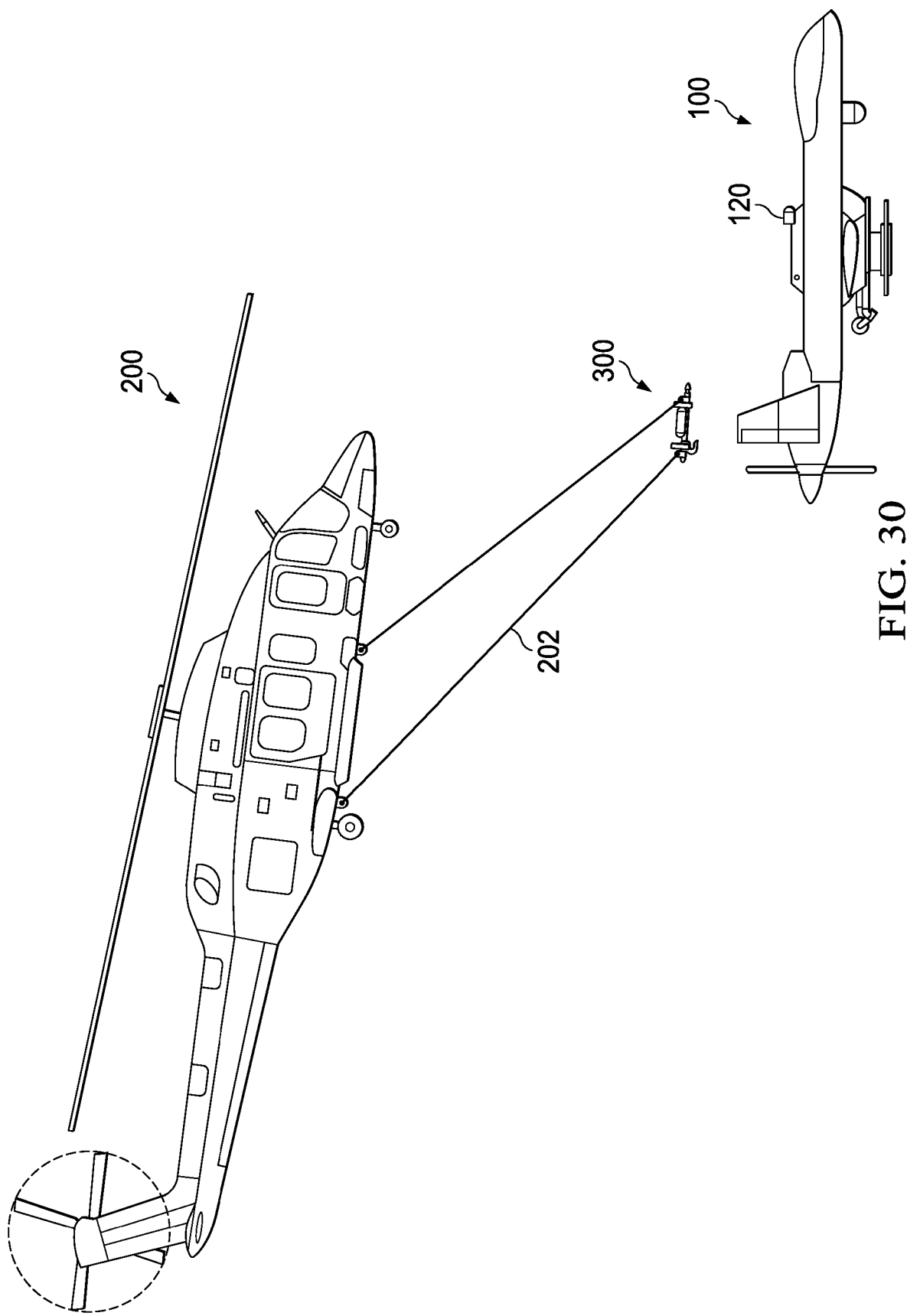

In some aspects, parasite aircraft 100 is transitioned from its stored configuration to its flight-ready configuration before being lifted by carrier aircraft 200 (e.g., see FIG. 23). In some aspects, parasite aircraft 100 is transitioned from its stored configuration to its flight-ready configuration after being lifted by carrier aircraft 200.

As illustrated in FIG. 23, parasite aircraft 100 has transitioned into its flight-ready configuration and carrier aircraft 200 has moved into position above parasite aircraft 100. With carrier aircraft 200 in place, maneuverable capture device 300 is lowered from carrier aircraft 200 (e.g., see FIG. 24). In some aspects, maneuverable capture device 300 flies itself to dock 120 using rotors 302 (e.g., see FIG. 25). In some aspects, maneuverable capture device 300 guides itself to parasite aircraft 100. For example, parasite aircraft 100, carrier aircraft 200, and/or maneuverable capture device 300 can include avionics, sensors, radar, light detection and ranging (LIDAR), GPS, cameras, and the like that can be used to automate guidance of maneuverable capture device 300 to dock 120. In some aspects, maneuverable capture device 300 is piloted remotely to parasite aircraft 100. For example, a person aboard carrier aircraft 200 can remotely pilot maneuverable capture device 300 to dock 120. Cameras may be positioned on parasite aircraft 100, carrier aircraft 200, and/or maneuverable capture device 300 to assist the person piloting maneuverable capture device 300.

As maneuverable capture device 300 descends toward parasite aircraft 100, cables 202 are let out a sufficient amount so that maneuverable capture device 300 does not significantly bear on cables 202 as maneuverable capture device 300 flies to dock 120. In some aspects, slight tension in cables 202 provides a steadying force for maneuverable capture device 300. Steadying can be beneficial because maneuverable capture device 300 is maneuvering through the prop wash of carrier aircraft 200. In some aspects, maneuverable capture device 300 is guided to dock 120 without using rotors 302 by instead maneuvering carrier aircraft 200 to position maneuverable capture device 300.

Maneuverable capture device 300 fits into dock 120 so that rod 312 enters housing 124 and hook 310 latches onto pin 126 as illustrated in FIGS. 14-16. With maneuverable capture device 300 in position, dock 120 locks onto maneuverable capture device 300 to secure parasite aircraft 100 to carrier aircraft 200 (e.g., see FIG. 26). Carrier aircraft 200 then lifts parasite aircraft 100 off of loading surface 180 and gains altitude and forward speed. Landing gear 114, 116 of parasite aircraft 100 can then be retracted. Enough altitude is gained so that carrier aircraft 200 can avoid any obstacles and continue to gain forward speed. As carrier aircraft 200 gains forward speed, wing 108 of parasite aircraft 100 begins to generate lift. Propulsion system 112 is powered on and begins to generate thrust that propels parasite aircraft 100 forward (e.g., see FIG. 27). Parasite aircraft 100 eventually begins to overtake carrier aircraft 200 (e.g., see FIG. 28) and cables 202 are let out to allow parasite aircraft 100 pull away from carrier aircraft without significantly pulling on carrier aircraft 200. Once parasite aircraft 100 has gained sufficient speed for self-powered flight, maneuverable capture device 300 is released (e.g., see FIG. 29). After release, maneuverable capture device 300 can be guided upward by rotors 302 and cables 202 are reeled in to prevent cables 202 from becoming tangled on parasite aircraft 100. In some aspects, parasite aircraft 100 can be released before parasite aircraft 100 has gained sufficient speed for self-powered flight. Upon release, parasite aircraft 100 loses altitude to gain additional speed for self-powered flight. Parasite aircraft 100 is now free to fly its mission and carrier aircraft 200 can return to base, capture another parasite aircraft 100 that has concluded its mission, or carry out another mission.

Once parasite aircraft 100 has completed its mission, it can return to a base for a traditional landing on the ground or aircraft carrier. Alternatively, parasite aircraft 100 can be retrieved in flight by carrier aircraft 200. To be recovered in flight by carrier aircraft 200, parasite aircraft 100 maintains a speed that can be matched by carrier aircraft 200. In some aspects, carrier aircraft 200 paces above and slightly behind parasite aircraft 100 to reduce the effect of prop wash from carrier aircraft 200 upon parasite aircraft 100 (e.g., see FIG. 30). Maneuverable capture device 300 is released from carrier aircraft 200 and guided by rotors 302 to dock 120. Cables 202 are let out as maneuverable capture device 300 flies to dock 120 so that maneuverable capture device 300 does not significantly bear upon cables 202. In some aspects, light tension in cables 202 provides a steadying force for maneuverable capture device 300 as it flies to dock 120. Maneuverable capture device 300 fits into dock 120 so that rod 312 enters housing 124 and hook 310 latches onto pin 126 (e.g., see FIGS. 14-16).

Figure 31:
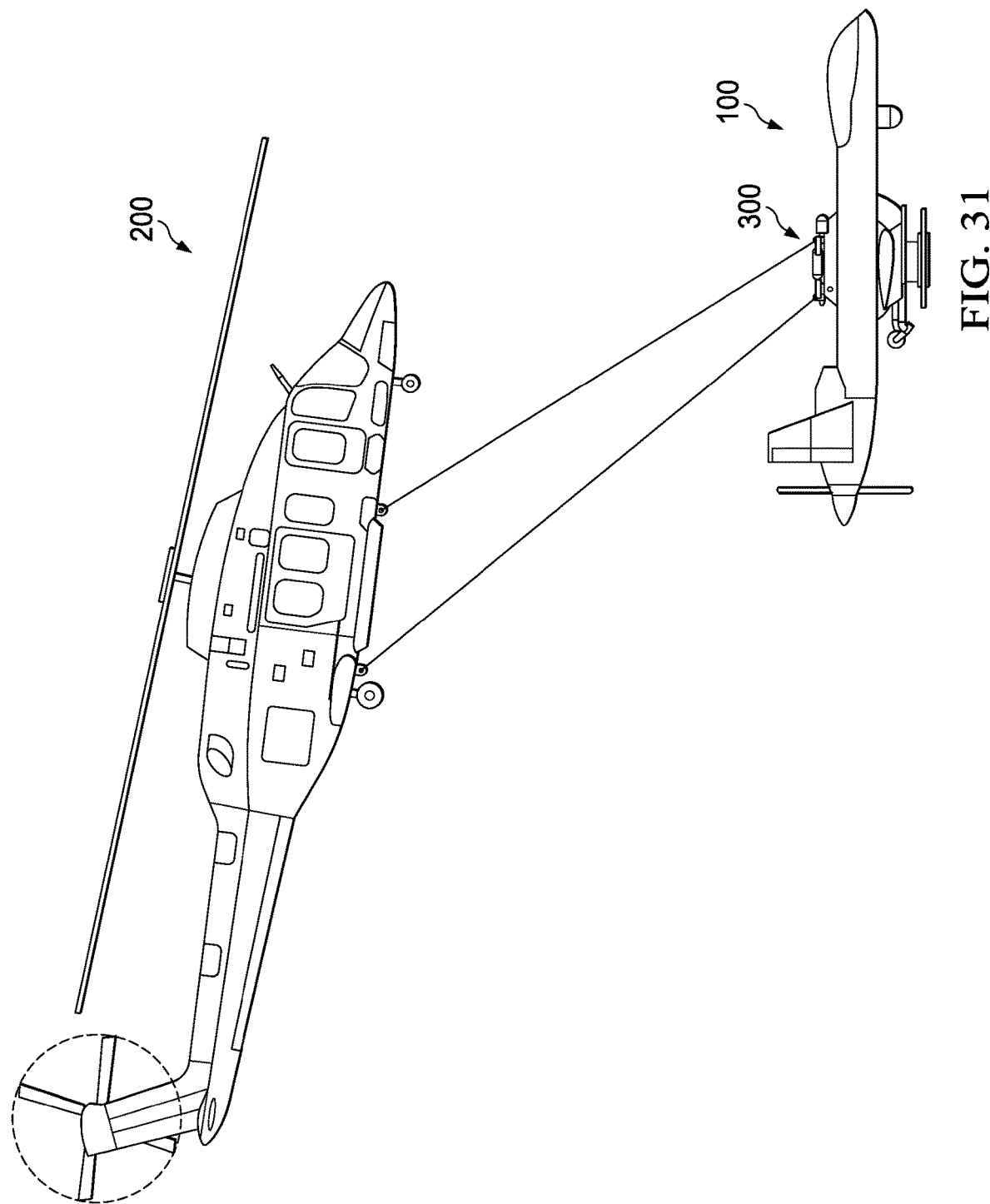
Figure 32:
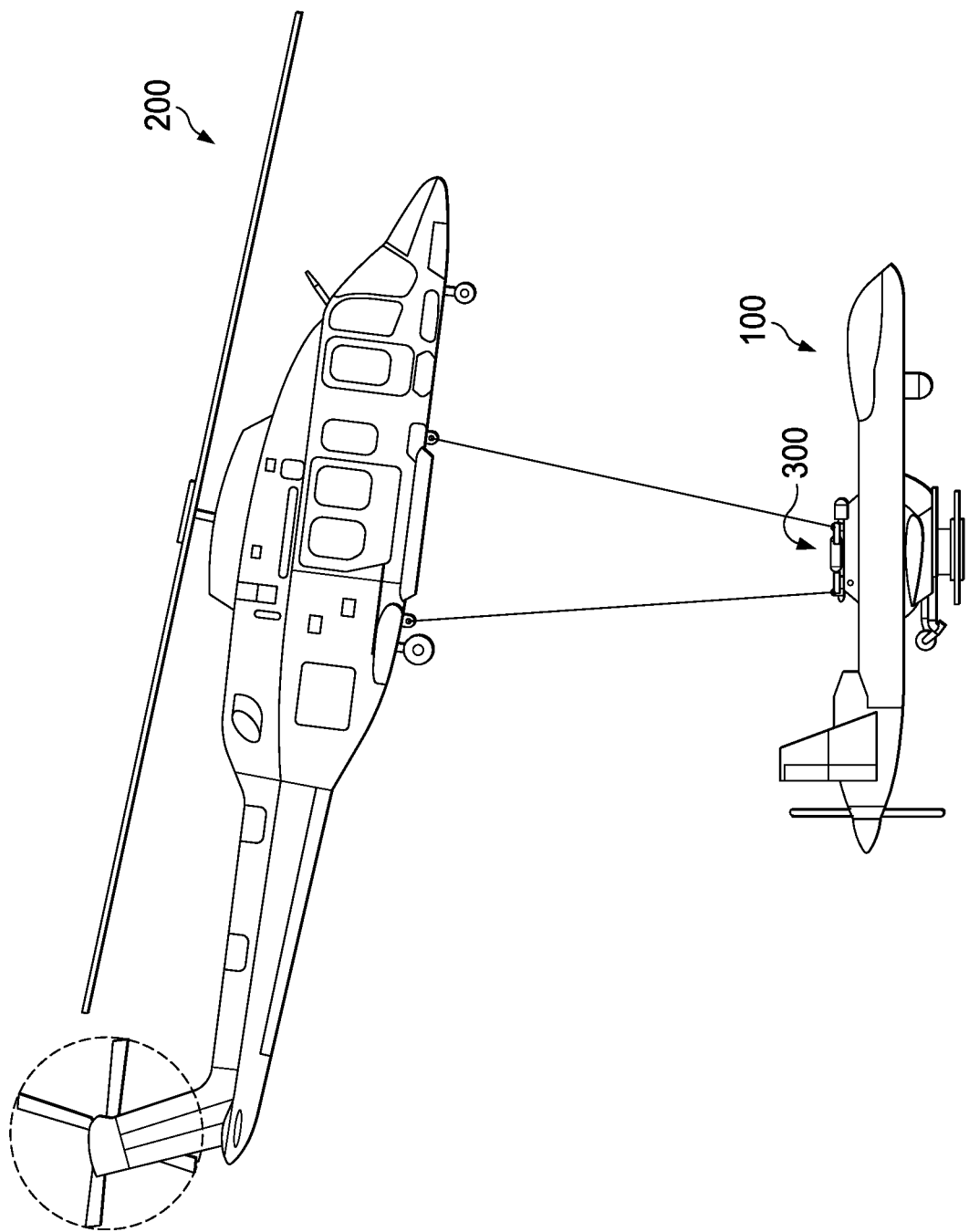
Figure 33:
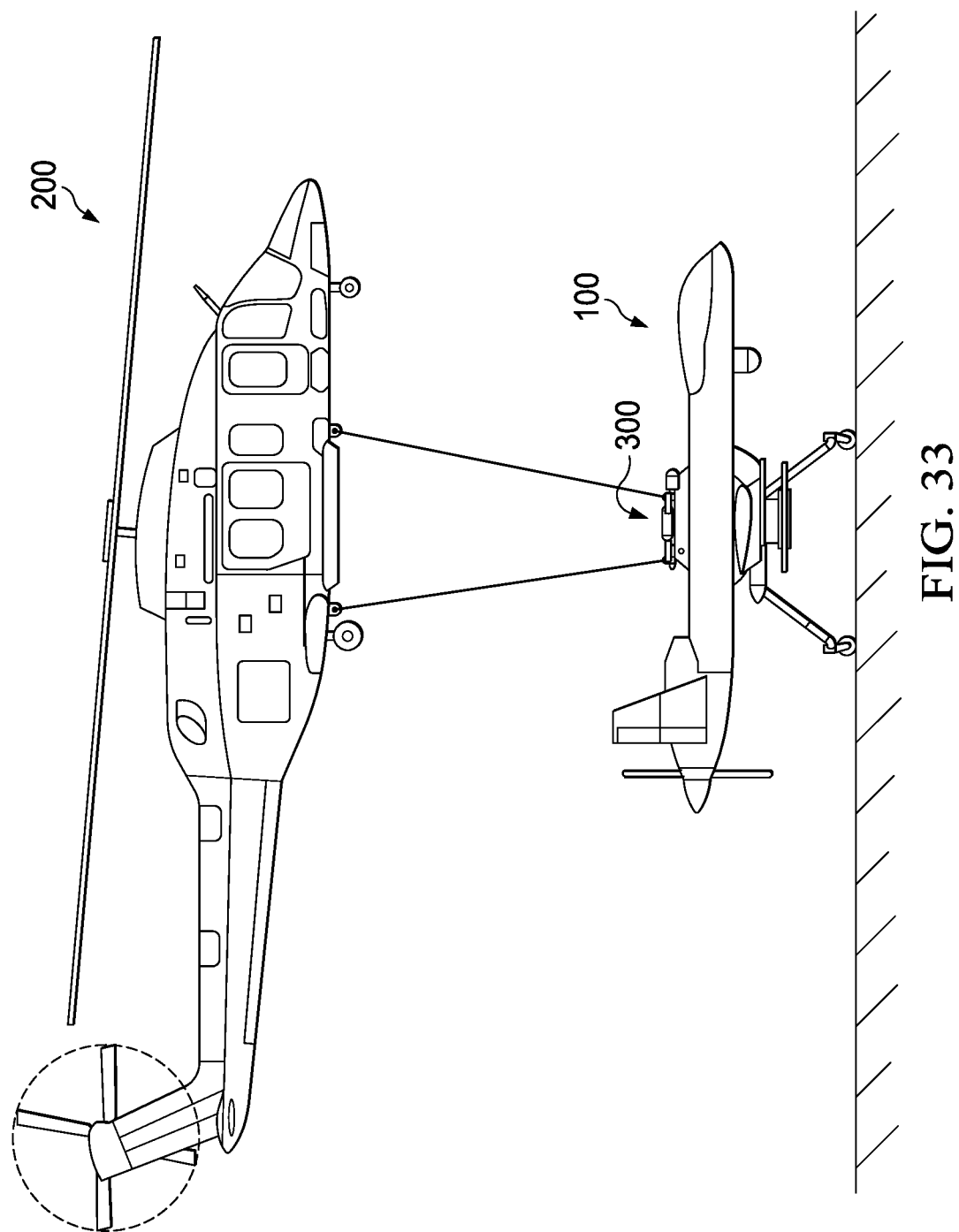

With maneuverable capture device 300 positioned in dock 120, dock 120 locks onto maneuverable capture device 300 to secure parasite aircraft 100 to carrier aircraft 200 (e.g., see FIG. 31). Propulsion system 112 is then slowly depowered and parasite aircraft 100 transitions from self-powered flight to being carried by carrier aircraft 200 as carrier aircraft 200 reduces its speed (e.g., see FIG. 32). Carrier aircraft 200 can then transport parasite aircraft 100 to a desired location, such as loading surface 180 (e.g., see FIG. 33). Once parasite aircraft 100 is set down on loading surface 180, maneuverable capture device 300 is released from dock 120 and secured to carrier aircraft 200 (e.g., see FIG. 34).

Once parasite aircraft 100 has been set down on the ground, parasite aircraft 100 can transition from the flight-ready configuration to the storage configuration. In some aspects, parasite aircraft 100 can be transitioned from the flight-ready configuration to the storage configuration while carrier aircraft 200 is transporting parasite aircraft 100 to loading surface 180. In some aspects, loading surface 180 may be deck 150 of a ship. In such instances, parasite aircraft 100 is cleared from deck 150 and placed into hangar 160 or 170 to clear room for carrier aircraft 200 to land on deck 150.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A maneuverable capture device comprising:
a frame;
a plurality of rotors secured to the frame;
an attachment point disposed on the frame for securing a cable of a carrier aircraft to the frame; and
an attachment feature configured to secure the frame to a dock of a parasite aircraft, the attachment feature comprising a rod that extends from the frame such that at least a portion of the rod is forward of the plurality of rotors, the rod configured to mate with a housing of the dock.

2. The maneuverable capture device of claim 1, wherein the rod is configured to enter an opening in the housing of the dock.

3. The maneuverable capture device of claim 1, wherein the rod comprises a groove configured to interact with a ball-lock disposed within the housing to secure the rod to the dock.

4. The maneuverable capture device of claim 1, wherein the attachment feature comprises a hook that extends from the frame, the hook configured to mate with a pin of the dock.

5. The maneuverable capture device of claim 1, further comprising:
a pair of cross-supports attached to the frame; and
wherein the plurality of rotors comprises four rotors and each cross-support of the pair of cross-supports includes one rotor disposed at each end of the cross-support.

6. The maneuverable capture device of claim 1, wherein each rotor of the plurality of rotors is configured to pivot relative to the frame to allow a direction of thrust of each rotor to be controlled.

7. The maneuverable capture device of claim 1, further comprising a housing disposed on the frame.

8. The maneuverable capture device of claim 1, further comprising a second attachment point for securing a cable of the carrier aircraft to the frame.

9. The maneuverable capture device of claim 1, wherein the attachment feature comprises a hook that extends from the frame substantially perpendicularly to the rod, the hook configured to mate with a pin of the dock.

10. A method of docking a maneuverable capture device with a parasite aircraft, the method comprising:
positioning a carrier aircraft above the parasite aircraft;
releasing the maneuverable capture device from the carrier aircraft;
flying the maneuverable capture device to a dock of the parasite aircraft;
securing the maneuverable capture device to the dock of the parasite aircraft, wherein the securing comprising positioning a rod of the maneuverable capture device into a housing of the dock, and wherein the rod extends forward of a plurality of rotors of the maneuverable capture device; and
wherein the maneuverable capture device is attached to the carrier aircraft by a cable.

11. The method of claim 10, further comprising letting out the cable from the carrier aircraft as the maneuverable capture device flies toward to the parasite aircraft.

12. The method of claim 10, wherein the securing comprises positioning the rod of the maneuverable capture device into an opening in the housing of the dock.

13. The method of claim 10, wherein the rod includes a groove that is configured to mate with a ball-lock disposed within the housing.

14. The method of claim 10, wherein the securing comprises positioning a hook of the maneuverable capture device around a pin of the dock.

15. The method of claim 10, wherein, during the positioning the carrier aircraft above the parasite aircraft, the parasite aircraft is positioned on a loading surface.

16. The method of claim 10, wherein, during the positioning the carrier aircraft above the parasite aircraft, the parasite aircraft is in flight.

17. The method of claim 10, wherein the flying the maneuverable capture device comprises pivoting the plurality of rotors of the maneuverable capture device to control a direction of thrust of the plurality of rotors.

18. A method of undocking a maneuverable capture device from a parasite aircraft, the method comprising:
  releasing the maneuverable capture device from a dock of the parasite aircraft, the releasing comprising unlocking a rod of the maneuverable capture device, the rod extending forward of a plurality of rotors of the maneuverable capture device;
  flying the maneuverable capture device away from the parasite aircraft; and
  reeling in a cable secured between the maneuverable capture device and a carrier aircraft.

19. The method of claim 18, wherein the releasing comprises unlocking a ball-lock from the rod of the maneuverable capture device.

20. The method of claim 18, wherein the flying comprises pivoting the plurality of rotors of the maneuverable capture device to control a direction of thrust of the plurality of rotors.

* * * * *